United States Patent
Zhao et al.

(10) Patent No.: US 11,032,720 B2
(45) Date of Patent: Jun. 8, 2021

(54) ELECTRONIC APPARATUS AND METHOD USED IN WIRELESS COMMUNICATIONS, AND COMPUTER READABLE STORAGE MEDIUM

(71) Applicant: Sony Corporation, Tokyo (JP)

(72) Inventors: Youping Zhao, Beijing (CN); Dongzhi Zhu, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/652,072

(22) PCT Filed: Dec. 28, 2018

(86) PCT No.: PCT/CN2018/124587
§ 371 (c)(1),
(2) Date: Mar. 30, 2020

(87) PCT Pub. No.: WO2019/129169
PCT Pub. Date: Jul. 4, 2019

(65) Prior Publication Data
US 2020/0252808 A1 Aug. 6, 2020

(30) Foreign Application Priority Data
Dec. 29, 2017 (CN) .......................... 201711481100.0

(51) Int. Cl.
*H04W 16/32* (2009.01)
*H04W 16/14* (2009.01)
(Continued)

(52) U.S. Cl.
CPC ........... *H04W 16/32* (2013.01); *H04W 16/14* (2013.01); *H04W 24/02* (2013.01); *H04W 24/08* (2013.01);
(Continued)

(58) Field of Classification Search
CPC ..... H04W 16/32; H04W 24/02; H04W 28/16; H04W 64/003; H04W 88/08
See application file for complete search history.

(56) References Cited

U.S. PATENT DOCUMENTS

2011/0151886 A1* 6/2011 Grayson ............... H04W 16/04
455/452.1
2015/0117210 A1* 4/2015 Yang ..................... H04W 28/08
370/235
(Continued)

FOREIGN PATENT DOCUMENTS

CN 102625320 A 8/2012
CN 105101227 A 11/2015
(Continued)

OTHER PUBLICATIONS

International Search Report and Written Opinion dated Mar. 7, 2019 for PCT/CN2018/124587 filed on Dec. 28, 2018, 9 pages including English Translation of the International Search Report.

*Primary Examiner* — Barry W Taylor
(74) *Attorney, Agent, or Firm* — Xsensus LLP

(57) ABSTRACT

An electronic apparatus and method used in wireless communications, and a computer readable storage medium, the electronic apparatus comprising: a processing circuit configured to determine by dynamic means a partitioning solution for a virtual cell in a predetermined region, determination of the partitioning solution for the virtual cell comprising partitioning of a plurality of access points in the predetermined region to be one or more virtual cells, and designating each of the virtual cells to serve as master access points; and generating a message indicating the virtual cell partitioning solution so as to notify all of the designated master access points.

19 Claims, 15 Drawing Sheets

(51) Int. Cl.
*H04W 24/02* (2009.01)
*H04W 24/08* (2009.01)
*H04W 28/16* (2009.01)
*H04W 64/00* (2009.01)
*H04W 88/08* (2009.01)

(52) U.S. Cl.
CPC ......... *H04W 28/16* (2013.01); *H04W 64/003* (2013.01); *H04W 88/08* (2013.01)

(56) References Cited

U.S. PATENT DOCUMENTS

2015/0327076 A1* 11/2015 Cui ........................ H04L 5/14
   370/280
2017/0027004 A1* 1/2017 Lu ........................ H04W 12/06
2019/0124522 A1* 4/2019 Cao ................... H04W 72/1226

FOREIGN PATENT DOCUMENTS

| CN | 105101234 A | 11/2015 |
|----|-------------|---------|
| EP | 3 142 402 A1 | 3/2017 |
| WO | 2015/131677 A1 | 11/2015 |
| WO | 2017/089896 A1 | 6/2017 |
| WO | 2016/180213 A1 | 3/2020 |

* cited by examiner

ELECTRONIC APPARATUS AND METHOD USED IN WIRELESS COMMUNICATIONS, AND COMPUTER READABLE STORAGE MEDIUM

CROSS-REFERENCE TO RELATED APPLICATIONS

The present application is based on PCT filing PCT/CN2018/124587, filed Dec. 28, 2018, and claims priority to Chinese Patent Application No. 201711481100.0, filed Dec. 29, 2017, each of which is incorporated herein by reference in its entirety.

FIELD

Embodiments of the present disclosure generally relate to the field of wireless communications, in particular to design of virtual cells, and more particularly to an electronic apparatus and a method for wireless communications, as well as a computer-readable storage medium.

BACKGROUND

In recent years, the increasing demand for mobile data rate causes network densification to become an important trend, and accordingly causes problems such as more frequent measurements and handovers. Since cells become smaller and smaller, there are more and more handover requests from the user, overlapping regions of neighboring cells are becoming smaller and smaller, and thus, handover time remained for the user is becoming shorter and shorter. An unbounded network may be created by virtualization to solve handover problems caused by mobility.

For example, virtual cells may be implemented by clustering access points (APs). A local anchor (also referred to as a master AP) is provided in each virtual cell, which is used to control the handovers within the virtual cell and the handovers among the virtual cells, and data of users in the coverage range of the whole virtual cell is transmitted via an ideal backhaul link between the local anchor and a core network.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry configured to: determine a dividing scheme of virtual cells in a predetermined region in a dynamical manner, determining the dividing scheme of virtual cells including dividing multiple access points (APs) in the predetermined region into one or more virtual cells and specifying an AP in each virtual cell as a master AP; and generate a message indicating the dividing scheme of the virtual cells to inform the specified master APs.

According to another aspect of the present disclosure, an electronic apparatus for wireless communications is provided. The electronic apparatus includes processing circuitry configured to: in response to a distributed searching request from a central management apparatus, perform iteration operations for virtual cell dividing in a predetermined region with respect to a particular searching location, where the searching location is the number of divided virtual cells; calculate, based on a virtual cell division obtained when the iteration operations converge, a network utility value corresponding to the searching location, where the network utility value is a weighted sum of a function of a packet loss ratio for each virtual cell and a function of handover overhead in the predetermined region, where the packet loss ratio is obtained based on backhaul capacity of a master AP of a corresponding virtual cell and a total backhaul requirement of the virtual cell; and generate a message containing the searching location and the network utility value, to report to the central management apparatus.

According to another aspect of the present disclosure, a method for wireless communications is provided. The method includes: determining a dividing scheme of virtual cells in a predetermined region in a dynamical manner, determining the dividing scheme of the virtual cells including dividing multiple access points (APs) into one or more virtual cells and specifying an AP in each virtual cell as a master AP; and generating a message indicating the dividing scheme of the virtual cells to inform the specified master APs.

According to another aspect of the present disclosure, a method for wireless communications is further provided. The method includes: in response to a distributed searching request from a central management apparatus, performing iteration operations for virtual cell dividing in a predetermined region with respect to a particular searching location, where the searching location is the number of divided virtual cells; calculating, based on a virtual cell division obtained when the iteration operations converge, a network utility value corresponding to the searching location, where the network utility value is a weighted sum of a function of a packet loss ratio for each virtual cell and a function of handover overhead in the predetermined region, where the packet loss ratio is obtained based on backhaul capacity of a master AP of a corresponding virtual cell and a total backhaul requirement of the virtual cell; and generating a message containing the searching location and the network utility value, to report to the central management apparatus.

According to other aspects of the present disclosure, there are further provided computer program codes and computer program products for implementing the methods above, and a computer readable storage medium having recorded thereon the computer program codes for implementing the methods described above.

The electronic apparatus and the method according to the present disclosure may dynamically determine the division of the virtual cells, thereby satisfying the communication requirement of a wireless network in a flexible and effective way.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
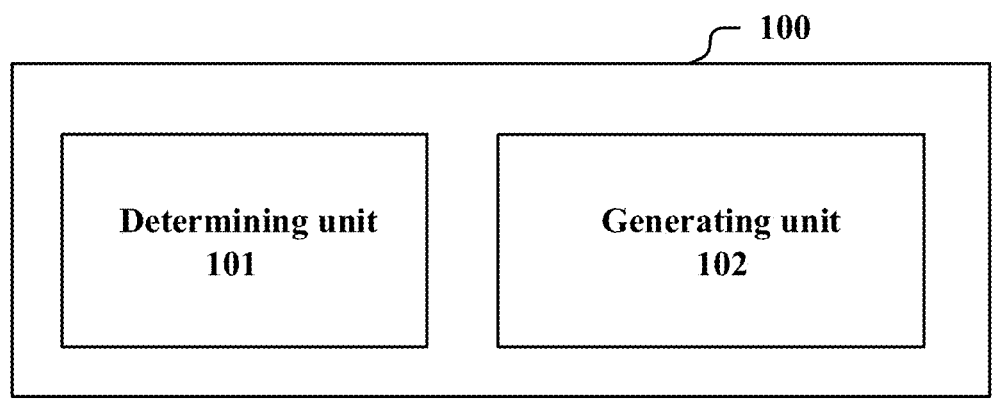
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes: a determining unit 101, configured to determine a dividing scheme of virtual cells in a predetermined region in a dynamical manner, determining the dividing scheme of the virtual cells including dividing multiple access points (APs) in the predetermined region into one or more virtual cells and specifying an AP in each virtual cell as a master AP; and a generating unit 102, configured to generate a message indicating the dividing scheme of the virtual cells to inform the specified master APs.

The determining unit 101 and the generating unit 102 may be implemented by one or more processing circuitries, which may be implemented, for example, as a chip.

Figure 2:
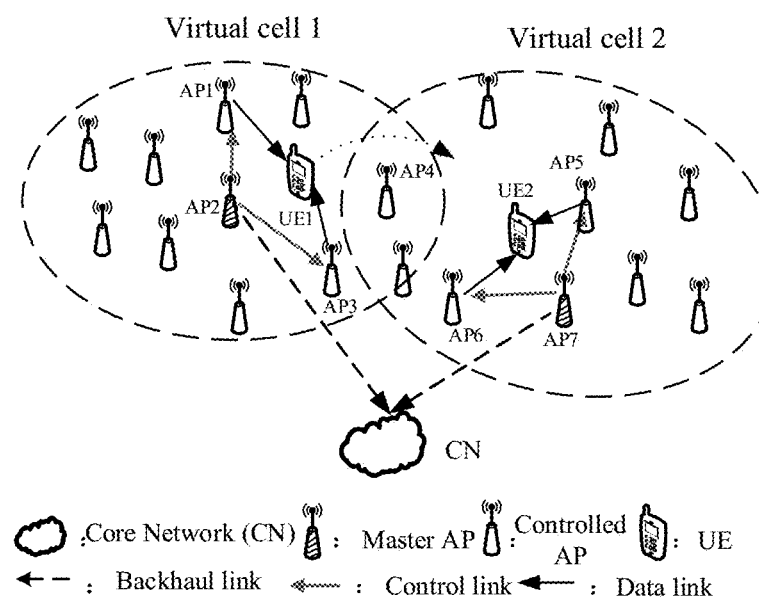
FIG. 2 is a diagram showing a scenario of a distribution of access points (APs) and a division of virtual cells as an example.

FIG. 2 is a diagram showing a scenario of a distribution of access points (APs) and a division of virtual cells as an example. It should be noted that, the AP described herein may be any node providing network communication service, such as a base station, a small base station and the like. The base station may be implemented as any type of evolved Node B (eNB) or gNB (5G base station). The eNB includes, for example, a macro eNB and a small eNB. The small eNB may be an eNB such as a pico eNB, a micro eNB and a home (femto-cell) eNB that covers a cell smaller than a macro cell. For gNB, the case may also be similar to that for eNB. Alternatively, the base station may also be implemented as any other type of base stations, such as a Node B and a base transceiver station (BTS). The base station may include: a main body (that is also referred to as a base station apparatus) configured to control wireless communications; and one or more remote radio heads (RRH) arranged at a different place from the main body. In addition, various types of terminals may each operate as the base station by temporarily or semi-persistently executing a base station function.

Furthermore, user equipment (UE, that is also referred to as a user) shown in FIG. 2 may be any terminal apparatus or a wireless communication apparatus providing services. For example, the terminal apparatus may be implemented as a mobile terminal (such as a smart phone, a tablet personal computer (PC), a notebook PC, a portable game terminal, a portable/dongle type mobile router, and a digital camera device), or an in-vehicle terminal (such as a car navigation apparatus). The terminal apparatus may also be implemented as a terminal that performs machine-to-machine (M2M) communication (that is also referred to as a machine type communication (MTC) terminal). Furthermore, the terminal apparatus may be a wireless communication module (such as an integrated circuit module including a single wafer) mounted on each of the above terminals.

The electronic apparatus 100 according to the embodiment of the present disclosure may cluster APs shown in FIG. 2 to obtain the division of the virtual cells, that is, each cluster of APs constitute a virtual cell. The electronic apparatus 100 may be, for example, located at the core network side shown in FIG. 2, or located at the central management apparatus side.

For example, in a scenario of a cognitive radio application, a spectrum management apparatus may play a role of the central management apparatus. In this case, the electronic apparatus 100 may be, for example, located at the spectrum management apparatus side. As an example, the electronic apparatus 100 may be implemented on a Spectrum Coordinator (SC), a Coexistence Manager (CxM) or a Spectrum Access System (SAS).

As shown in FIG. 2, the distribution of the APs is dense. In the case that the UE moves in a region shown in FIG. 2, a handover among APs occurs frequently, which may incur a large handover overhead, such that communication quality and resource utilization efficiency are reduced. The APs can be dynamically clustered to form multiple virtual cells, thereby reducing the handover overhead.

Therefore, the determining unit 101 of the electronic apparatus 100 determines the dividing scheme of the virtual cells in a dynamical manner, which is flexibly applicable to scenarios of various APs distributions and UE distributions. Determining the dividing scheme of the virtual cells includes two aspects: dividing multiple APs into one or more virtual cells; and specifying an AP in each virtual cell as a master AP. The master AP is in charge of the resource management of the corresponding virtual cell. Since the division of virtual cells is dynamical, the master APs are also not fixed, but change with movement of the UE or a change in a state of the APs.

The generating unit 102 generates a message containing the dividing scheme of the virtual cells to provide the dividing scheme to the specified master APs. The master AP divides the virtual cells according to the dividing scheme and performs communications.

Accordingly, although not shown in FIG. 1, the electronic apparatus 100 may further include a communicating unit configured to perform various transceiving operations. The communicating unit may be, for example, implemented as an antenna or an antenna array and circuitry elements that are associated with the antenna or the antenna array.

Operations of the determining unit 101 and the generating unit 102 may be performed in response to one or more of the following: the handover overhead of one or more current virtual cells exceeds a predetermined overhead threshold; backhaul requirement of one or more current virtual cells exceeds a backhaul capacity threshold of the respective virtual cells; and a predetermined period of time elapses. In other words, the operations of the determining unit 101 and the generating unit 102 may be performed periodically and/or in a trigger manner. In this case, degradation of the communication quality may be avoided.

The operations of the determining unit 101 and the generating unit 102 correspond to the updating of the division of the virtual cells, and a time interval between two times of the updating is referred to as an updating time slot. In the case that the operations of the determining unit 101 and the generating unit 102 are performed periodically, the updating time slot is equal to the above predetermined period of time.

In one example, the determining unit 101 determines the dividing scheme of the virtual cells based on one or more of the following: backhaul capacity of master APs of the virtual cells; and handover overhead due to handover of user equipment among virtual cells. The network communication quality may be effectively ensured by considering at least one of the above factors to divide the virtual cells.

Since backhaul operations of all of the user equipment in coverage range of the virtual cell are performed by the master AP, and the backhaul capacity between the master AP and the core network is limited, if backhaul requirement of the user equipment exceeds the backhaul capacity, packet loss occurs, such that the communication quality is reduced. For example, in the case that the coverage range of the virtual cell is too large, a case that the backhaul requirement exceeds the backhaul capacity of the master AP may occur.

In another aspect, the current serving AP of the user equipment makes a handover decision for the user equipment, and then, the current serving AP needs to send a handover request to the current master AP. Then, the current master AP sends the handover request to a master AP in a target neighbor virtual cell, and then the master AP in the target neighbor virtual cell sends an access request to a target serving AP in the target neighbor virtual cell. After receiving the access request, the target serving AP returns an handover accept signaling back to the current serving AP on the same way. Finally, the current serving AP sends a handover command to the user equipment. After the user equipment makes synchronization with the target serving AP, the master AP in the neighbor virtual cell sends a resource release signaling to the master AP in the original virtual cell and then, the master AP in the original virtual cell sends the resource release signaling to the original serving AP for the user equipment, and finally a handover of the user equipment between virtual cells is completed. It can be seen that, the more frequently the handover among virtual cells occurs, the larger handover overhead among the virtual cells is involved.

If the coverage range of the virtual cell is too small, handover among virtual cells occurs frequently, thereby resulting in large handover overhead among virtual cells.

For example, the determining unit 101 may be configured to determine the dividing scheme of the virtual cells, such that a network utility value is the highest in the case of adopting the dividing scheme. The network utility value is related to packet loss ratios of respective virtual cells and the handover overhead in the predetermined region, for example, the network utility value is a weighted sum of a function of a packet loss ratio for each virtual cell and a function of handover overhead in the predetermined region, where the packet loss ratio is obtained based on backhaul capacity of the master AP of the corresponding virtual cell and a total backhaul requirement of the virtual cell.

The network utility value U may be, for example, shown by the following formula (1):

$$U = a \cdot E\{f_1(PL_n)\} + b \cdot f_2(H) \quad (1)$$

In the formula (1), f1 is a utility function of the packet loss ratio for each virtual cell, $PL_n$ is the packet loss ratio of the n-th virtual cell, E( ) represents an average operation, $f_2$ is a utility function of handover overhead in the predetermined region, and H is an estimated handover overhead among virtual cells (for example, the number of times of handover) in the updating time slot in the case of adopting the dividing scheme of the virtual cells, a and b are weight coefficients, and a+b=1.

The weight coefficients a and b may be set according to actual requirements, or the weight coefficients a and b are set as empirical values. It should be understood that, in the case that one of a and b is 0, the dividing scheme of the virtual cells is determined only based on a single factor. Furthermore, $f_1$ and $f_2$ may be any appropriate utility functions without any restrictions. The form of the network utility value U is not limited to that shown in formula (1), and may have other appropriate modifications or changes. The formula (1) is only an example given for the purpose of understanding.

Exemplarily, the packet loss ratio of the n-th virtual cell in the formula (1) may be estimated by the following formula (2).

$$PL_n = \begin{cases} \dfrac{R_n^{traffic} - C_n}{R_n^{traffic}}, & R_n^{traffic} > C_n \\ 0, & R_n^{traffic} \leq C_n \end{cases} \quad (2)$$

In the formula (2), $R_n^{traffic}$ is an estimated total data backhaul requirement of all of the user equipment within the coverage range of the n-th virtual cell, $C_n$ is a backhaul capacity between the master AP of the n-th virtual cell and the core network.

In order to calculate the network utility value and then determine the dividing scheme of the virtual cells, the determining unit 101 is further configured to acquire one or more of the following from current master APs: a location of each AP, backhaul capacity of each AP, a backhaul requirement, location and movement information of user equipment within coverage range of a corresponding virtual cell. The movement information includes, for example, moving speed, historical movement data and the like.

Furthermore, in the case that the electronic apparatus 100 is located at a central management apparatus side, if there is another central management apparatus in the predetermined region, the determining unit 101 may further interact with the electronic apparatus of another central management apparatus, to obtain information of APs which are managed by the another central management apparatus and/or provide information of APs managed by the present central management apparatus to the another central management apparatus. The information of the APs includes, for example, locations of the APs, backhaul capacity of the APs and the like.

For example, in the scenario of the cognitive radio communication, if the electronic apparatus 100 is located at the spectrum management apparatus side, the determining unit 101 may interact with another spectrum management apparatus in the predetermined region to exchange information of the respectively managed APs. As described above, the spectrum management apparatus may be SC, CxM, SAS and the like.

The determining unit 101 may evaluate performance of the dividing scheme of the virtual cells by using the network utility value, to determine an optimum or relatively good dividing scheme. For ease of understanding, an example of dividing virtual cells based on machine learning is described below. However, it should be understood that this example is not limitative of the present disclosure.

In this example, the determining unit 101 is configured to: take the number of the divided virtual cells as a searching location, and perform, with respect to different searching locations, iterating operations for virtual cell dividing; calculate, based on a virtual cell division obtained when the iteration operations complete, a network utility value corresponding to the searching location; optimize the searching location at which to perform the iteration operations based on the network utility value, to determine an optimum searching location; and determine the dividing scheme of the virtual cells corresponding to the optimum searching location as the dividing scheme of the virtual cells to be adopted.

Referring to the scenario shown in FIG. 2, since it is unknown that how many virtual cells the APs are to be divided into and how to divide can arrive at the optimum performance, the above operation of the determining unit 101 nests two iteration operations, that is, an iteration operation for a given searching location and a second iteration operation where the searching location is changed.

In other words, firstly, $N_p$ different searching locations in the integer interval [1, M] are randomly selected to perform the division of the virtual cells respectively, where M is the number of APs in the predetermined region, the searching location represents the number of the virtual cells obtained by dividing the predetermined region and the value of $N_p$ may be determined based on computing capability of the apparatus, the required computing speed and the like.

With respect to each searching location, the determining unit 101 performs iteration operations to determine an optimum dividing manner. For example, which APs should be divided into a cluster, and which AP should serve as the master AP.

In one example, the determining unit 101 performs the iteration operations for the virtual cell dividing as follows: 1) select, according to the location and backhaul capacity of each AP, a first number of APs with the first number corresponding to the searching location as candidate APs for the master AP of each virtual cell; 2) cluster the APs based on weighted distances between each AP and the candidate APs, where the weighted distance is related to an actual distance between the AP and the candidate AP, and a weighting factor based on the backhaul capacity of the candidate AP, for example, the weighted distance may be a product of the actual distance and the weighting factor; 3) and with respect to each cluster, update the candidate AP for the cluster, and re-perform the clustering based on the weighted distances using the updated candidate APs until a predetermined condition is satisfied, taking the candidate APs of clusters finally obtained as the master APs of virtual cells.

In 1), a first number such as K APs with large distances between each other and with a large backhaul capacity may be selected as candidate access points. The candidate access points are candidates for the master AP of each cluster.

In 2), the access points other than the K candidate access points are divided, that is, it is determined to which candidate access point's cluster these access points should be allocated, respectively. The clusters for the K candidate access points finally determined are K virtual cells. The access points may be clustered based on a weighted distance from the access point to the candidate access point. It should be noted that clustering is not limited thereto, and clustering may be performed based on the actual distance from the access point to the candidate access point.

In one example, a weighting factor may be set, such that the stronger backhaul capacity the candidate access point has, the more tendency there is to allocate an access point to the cluster for the candidate access point, and the larger backhaul requirement the user equipment around the candidate access point has, the less tendency there is to allocate the access point to the cluster for the candidate access point. That is, the weighting factor may be a tradeoff between the two tendencies. For example, the weighting factor may be set, such that a probability for an AP being allocated to a cluster whose candidate AP has stronger backhaul capacity is larger than a probability for the AP being allocated to a cluster whose candidate AP has weaker backhaul capacity; and a probability for an AP being allocated to a cluster whose candidate AP has user equipment with a larger backhaul requirement around it is smaller than a probability for the AP being allocated to a cluster whose candidate AP has user equipment with a smaller backhaul requirement around it. In the case of adopting the weighted distance, not only the influence of the actual distance but also the backhaul capability of the candidate access point is considered, thereby facilitating to obtain a better dividing scheme.

Specifically, the weighting factor may be, for example, a normalized value of a ratio between an estimated backhaul requirement of user equipment around the candidate AP and the backhaul capacity of the candidate AP. For example, the weighting factor is shown by the following formula (3).

$$w_i = \frac{R_i/C_i}{\sum_{k=1}^{K} R_i/C_i} \quad (3)$$

In the formula (3), $w_i$ is a weighting factor that an AP is allocated to an i-th cluster (i=1, . . . , K), $R_i$ is possible requirement of the user equipment around the i-th candidate access point, and $C_i$ is backhaul capacity between the i-th candidate access point and the core network. It should be noted that, since clustering is not determined when the weighting factor is calculated, it is not possible to determine in which a virtual cell each user equipment is located. In view of this, $R_i$ in the formula (3) is an estimated value, that is, it is required to roughly estimate possible backhaul requirement around the i-th candidate access point. For example, backhaul requirement of user equipment within a predetermined distance $r^K$ from the i-th candidate access point may be taken as $R_i$. In the case that a width of the predetermined region is x, for example, $r^K$ may be set to:

$$r^K = \frac{x}{\sqrt{K}}\varepsilon \quad (4)$$

In the formula (4), $$\frac{x}{\sqrt{K}}$$

represents a distance between two candidate access points under the condition that each candidate access point is uniformly distributed in the predetermined region, $\varepsilon$ is an elastic variable and ranges from 0 to 1. It should be understood that the more the clusters to be divided is, the smaller $r^K$ is.

For example, the determining unit 101 may allocate an access point to a cluster whose candidate access point is corresponding to the smallest weighted distance. Taking the formula (3) as an example, if there is $w_i d_{mi} \leq w_j d_{mj}$ for each $\forall j \in [1,K](j \neq i)$, the m-th AP is allocated to a cluster for the i-th candidate access point, where $d_{mi}$ represents a geometry distance between the i-th candidate access point and the m-th AP.

After completing the clustering operation in 2), with respect to each cluster, the candidate AP of the cluster is updated in 3) to perform the next iteration, that is, to perform the clustering in 2) again. For example, with respect to each cluster, the center of locations of all of the access points contained in the cluster may be calculated, and the access point in the cluster which is closest to the center is selected as the candidate access point for next iteration.

The iteration operations are performed until the predetermined condition described in 3) is satisfied, to obtain an optimized dividing scheme of the virtual cells at the searching location. The predetermined condition includes, for example, one or more of the following: variation of the locations of the candidate APs between two clustering operations is below a predetermined degree; the number of times of performing clustering operations achieves a predetermined value. In other words, in the case that the locations of the candidate access points are substantially unchanged, it is indicated that the iteration algorithm tends to converge, and the iteration may be stopped in this case. Alternatively, when a predetermined number of times of operations are performed, the iteration is stopped to effectively control the calculation load.

The candidate access points of respective clusters finally obtained are taken as the master APs of virtual cells no matter which predetermined condition is adopted. The determining unit 101 may determine boundaries of the virtual cells based on the finally obtained clustering result, thereby completing the division of the virtual cells at a given searching location.

Next, the determining unit 101 calculates, based on the obtained division of virtual cells, a network utility value at the searching location. For example, the formula (1) may be used for calculation, which involves handover overhead due to handover of user equipment among virtual cells and/or a degree that the master AP satisfies the backhaul requirement of the user equipment.

For example, the determining unit 101 may estimate handover overhead among virtual cells based on the boundaries of the virtual cell and movement information of the user equipment. Specifically, in the case that handover overhead is generated when the user equipment moves across the boundaries of the virtual cells, the determining unit 101 may estimate the number of times of penetrations of active user equipment near the determined boundaries of the virtual cells, in combination with movement information of the user equipment such as moving speed, historical movement data of the user equipment, and map information and the like, so as to count the total number of effective penetrations through the boundaries, that is, the total handover overhead, under the dividing scheme of the virtual cells at the corresponding searching location.

Figure 3:
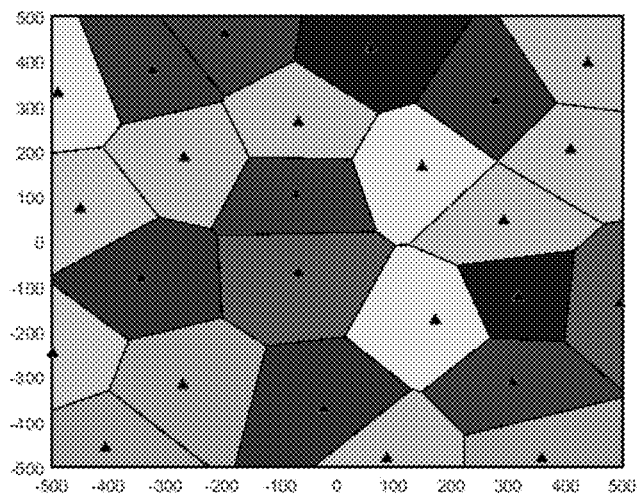
FIG. 3 is a schematic diagram showing boundaries of each AP generated with a Voronoi diagram, in a scenario where 25 APs are randomly distributed in a region of 1 km×1 km.
Figure 4:
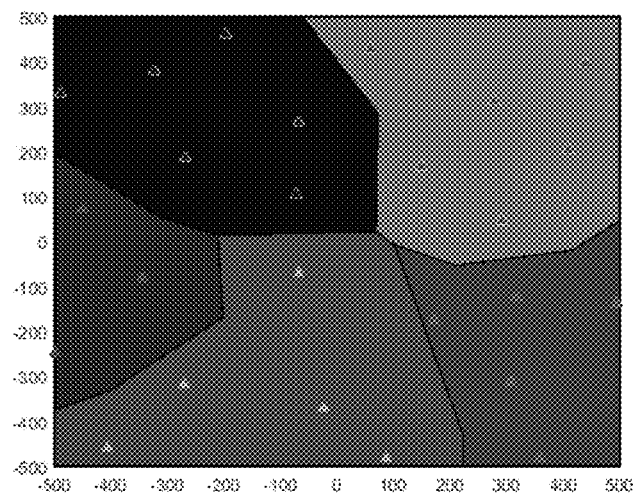
FIG. 4 is a schematic diagram showing the boundaries of the virtual cells obtained in the case that the region shown in FIG. 3 is divided into 5 virtual cells.

In one example, the determining unit 101 may get boundaries of virtual cells by using a Voronoi diagram. The Voronoi diagram is a distance-based plane division method used in computation geometry. Specifically, it is assumed that there are n non-coincident seed points on a plane, the plane is divided into n regions, such that the distance from the point in each region to the seed point in the region in which the point is located is shorter than the distance from the point to the seed point in other regions. Each region is referred to as a Voronoi region for the seed point. For ease of understanding, FIG. 3 shows a schematic diagram of boundaries of each AP generated with a Voronoi diagram, in a scenario where 25 APs are randomly distributed in a region of 1 km×1 km. FIG. 4 shows a schematic diagram of the boundaries of a virtual cell obtained by merging the boundaries of APs belonging to the same cluster when the division of the virtual cell is completed in the case that the number of virtual cells is 5.

Furthermore, the determining unit 101 estimates maximum data backhaul requirement of each virtual cell in one updating time slot, in combination with the data backhaul requirement and handover conditions of the user equipment, and calculates a packet loss ratio under the dividing scheme of the virtual cells by using, for example, the formula (2). Finally, a network utility value under the dividing scheme of the virtual cells is calculated using for example the formula (1) as the network utility value at the searching location.

It should be noted that, the determining unit 101 may further provide boundaries information of the virtual cell to current master APs of the virtual cells, the current master APs of the virtual cells estimate, in combination with movement information of the user equipment in a coverage range, number of times that the boundaries within the coverage range may be penetrated, and provide the number of times to the determining unit 101. That is, at least a part of the estimation of handover overhead may be performed by the current master APs of the virtual cells.

As described above, network utility values at $N_p$ searching locations are obtained respectively, and next, a searching location at which iteration operations for division of the virtual cells are to be performed is optimized based on the obtained network utility values, to determine an optimum searching location, for example, to determine a searching location with a maximum network utility value.

In one example, the network utility values at the $N_p$ searching locations may be compared to select the maximum network utility value as the global optimum value and the searching location corresponding to the maximum network utility value is taken as a global optimum searching location. With respect to each of the $N_p$ searching locations, the searching location for the next iteration operation is updated based on a searching location for the previous iteration operation and the corresponding network utility value as well as the global optimum searching location and the corresponding network utility value. Then, the iteration operations for the virtual cell dividing are completed with respect to the updated $N_p$ searching locations, to obtain the updated $N_p$ network utility values. The above operations constitute the second iteration operations. The global optimum value and the corresponding global optimum searching location are updated by using the updated $N_p$ network utility values. The second iteration operations are performed repeatedly until a predetermined condition is satisfied. The predetermined condition may include, for example, one or more of the following: the global optimum searching location is no longer changed; variation of the network utility value corresponding to the global optimum searching location between two second iteration operations is below a predetermined degree; the number of times of performing the second iteration operations achieves a predetermined value.

When the second iteration operations is completed, it is considered that the global optimum searching location is obtained, thereby determining the dividing scheme of the virtual cells to be adopted in the next time slot. The generating unit 102 generates a message containing the dividing scheme to inform the specified master APs.

Furthermore, the determining unit 101 may be further configured to determine, based on the backhaul requirement and communication quality requirement such as Signal to interference and noise ratio (SINR) of each determined virtual cell, spectrum requirement of the virtual cell, and determine a spectrum allocation scheme according to the spectrum requirements. The generating unit 102 may further generate a message containing the spectrum allocation scheme to inform the master APs.

In a scenario of the cognitive radio, the determining unit 101 may request available spectrum resources to the spectrum management apparatus. For example, the determining unit 101 may request the available spectrum resources to the spectrum management apparatus such as an SAS via a domain proxy. The electronic apparatus 100 is, for example, implemented on a logical entity CxM.

Specifically, for example, the determining unit 101 sends spectrum requirement to the domain proxy, the domain proxy sends a spectrum query request to the SAS, and the SAS sends a spectrum query response to the domain proxy. The domain proxy informs the determining unit 101 of the available spectrum resources. Then, the determining unit 101 sends a resource release request to the current master APs, and sends an access control request to new master APs. The current master APs sends resource release acknowledgement information to the core network, and the new master AP sends access control acknowledgement information to the determining unit 101. A transceiving unit sends information containing the spectrum allocation scheme to the new master APs, or also sends the information to the controlled APs.

Figure 5:
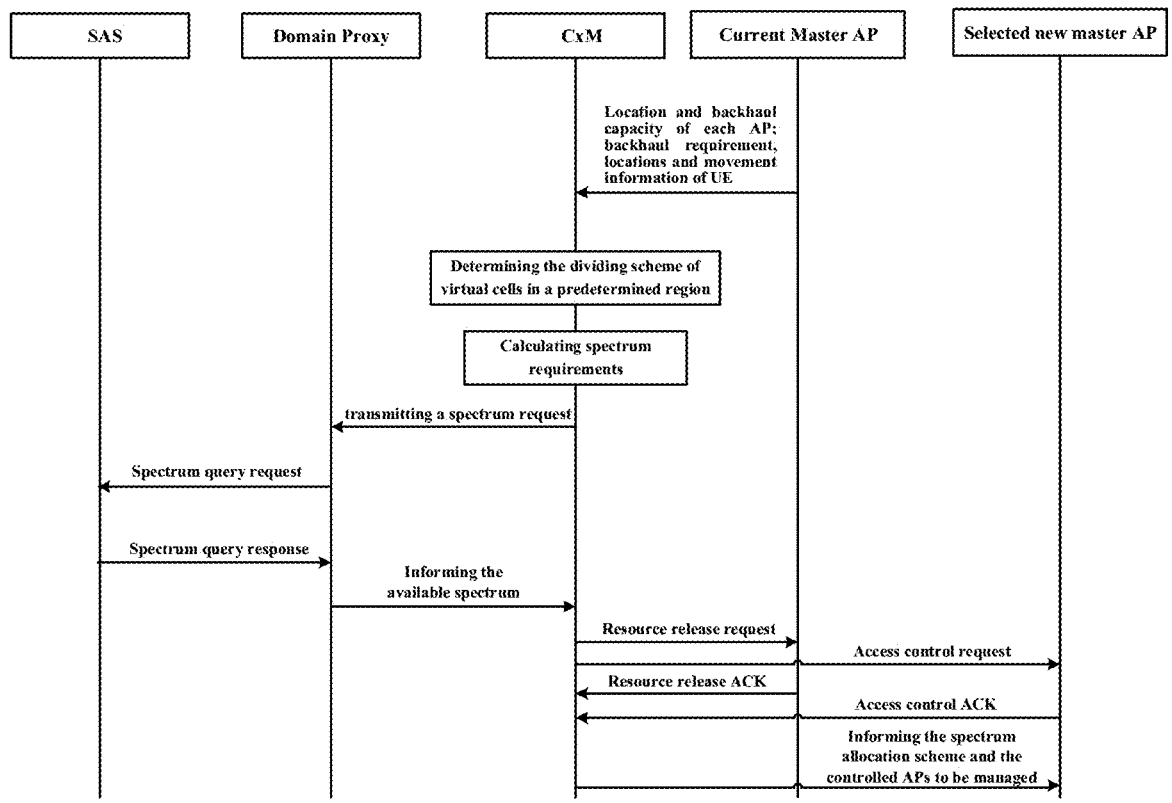
FIG. 5 is an exemplary schematic diagram showing an information procedure for implementing division of virtual cells on a coexistence manager.

FIG. 5 is an exemplary schematic diagram showing information procedure for implementing a division of virtual cells on a CxM. In FIG. 5, the electronic apparatus 100 is implemented on the CxM, and a master AP may be, for example, implemented as a citizens broadband radio service device (CBSD). Firstly, a current master AP provides various information required for the division of the virtual cells to the CxM, which includes but is not limited to: location and backhaul capacity of each access point for which the master AP is responsible, backhaul requirement, location and movement information such as moving speed and historical movement information and the like of the UE in a coverage range of the current virtual cell. After such information is obtained, the division of the virtual cells is performed on the CxM using the method of dividing the virtual cells described in detail in the above embodiment. The specific method has been described above in detail, which is not repeated herein. Next, the CxM determines, for example based on backhaul requirement and communication quality requirement of the virtual cell, spectrum requirement of the virtual cell, and sends a spectrum request to the domain proxy. The domain proxy sends a spectrum query request to a SAS. Then, the SAS sends a spectrum query response to the domain proxy, such that the domain proxy informs the CxM of available spectrum resources accordingly. The CxM sends a resource release request to each of the current master APs and sends an access control request to the new master APs. Each of the current master APs sends a resource release acknowledgement (ACK) message to the CxM, and the new master APs send an access control ACK message to the CxM. Finally, the CxM sends information containing a spectrum allocation scheme and controlled APs to be managed, that is, the dividing scheme of the virtual cells, to the new master APs.

It should be understood that, the information procedure shown in FIG. 5 is only exemplary rather than restrictive, which may be modified or changed according to actual requirements and application scenario.

The electronic apparatus 100 according to the embodiment may dynamically determine the dividing scheme of the virtual cells in the predetermined region, such that the dividing scheme may be applicable to various scenarios flexibly, thereby ensuring communication quality.

Second Embodiment

Referring back to FIG. 1, in the embodiment, the determining unit 101 is configured to: select, according to a current load of each master AP, a predetermined number of master APs as searching nodes; instruct the searching nodes to perform the iteration operations for the virtual cell dividing with respect to different searching locations respectively, where the searching location is the number of divided virtual cells; perform following second iteration operations, until a predetermined condition is met: acquire, from each of the searching nodes, a network utility value of the dividing scheme of the virtual cells for a corresponding searching location; and determine a global optimum searching location based on the network utility values; and provide the global optimum searching location and its corresponding network utility value to the searching nodes, such that each searching node updates the searching location for the next iteration operation, based on the global optimum searching location and its corresponding network utility value as well as a searching location for the last iteration operation for the searching node and the corresponding network utility value.

In the embodiment, the determination of the dividing scheme of the virtual cells is performed in a distributed manner by the searching nodes, that is, the global optimum searching location is searched in a distributed manner, thereby reducing the calculation load of the electronic apparatus 100. For example, a master AP with a lighter load and/or stronger calculation capability among the current master APs may be selected as a searching node. The number of the selected searching nodes $N_p$ depends on, for example, real-time requirement and processing capability of the master AP. In the case that the real-time requirement is high and/or the processing capability of the master AP is strong, $N_p$ may be set to be large.

In one example, the generating unit 102 is further configured to generate a distributed searching request to be provided to the selected searching nodes, and acquire a response to the distributed searching request from the searching nodes.

The determining unit 101 is further configured to provide one or more of the following to the searching nodes: a location of each AP, backhaul capacity of each AP, backhaul requirement, location and movement information of user equipment. The movement information of user equipment includes, for example, moving speed, historical movement data and the like of the user equipment (it may include only one kind thereof).

It should be noted that, at least a part of the above information provided to the searching nodes may also be provided by the current master APs. For example, a current master AP may collect the location, movement information, data backhaul requirements and the like of UE of the current master AP and provide the above information to the searching nodes.

Initially, each of the selected $N_p$ searching nodes performs the division of the virtual cells with respect to a randomly selected initial searching location, that is, performs the iteration operations for the virtual cell dividing described in the first embodiment, to determine the dividing scheme of the virtual cells at the initial searching location. And the network utility value is calculated further based on the dividing scheme.

Each searching node provides its initial searching location and the calculated corresponding network utility value to the electronic apparatus 100. For example, the determining unit 101 compares the network utility values at the $N_p$ searching locations to select the maximum network utility value as an initial value of the global optimum value and take its corresponding searching location as the initial global optimum searching location.

Next, the global optimum value and the global optimum searching location are provided to the $N_p$ searching nodes, such that each searching node updates the searching location for next iteration operation, based on a searching location for its previous iteration operation and the corresponding network utility value as well as the global optimum searching location and the global optimum value. Then, the $N_p$ searching nodes use new searching locations to complete the iteration operations for the virtual cell dividing, so as to obtain the updated $N_p$ network utility values, and provide the new searching locations and network utility values to the determining unit 101. The determining unit 102 updates the global optimum value and the global optimum searching location based on the updated searching locations and network utility values.

The above operations constitute a second iteration operation. The second iteration operations are performed repeatedly to search for the final global optimum value and global optimum searching location. Details about the iteration operations for the virtual cell dividing and the second iteration operations are described in detail in the first embodiment, which are not repeated herein.

Similarly, the above predetermined condition may include, for example, one or more of the following: the global optimum searching location is no longer changed; variation of the network utility value corresponding to the global optimum searching location between two second iteration operations is below a predetermined degree; the number of times of performing the second iteration operations achieves a predetermined value.

Furthermore, the determining unit 101 is further configured to acquire, from a searching node providing the final global optimum searching location, the dividing scheme of the virtual cells corresponding to the final global optimum searching location as the dividing scheme of the virtual cells to be adopted. In one example, the dividing scheme of the virtual cells further includes information of boundaries of the virtual cells.

Figure 6:
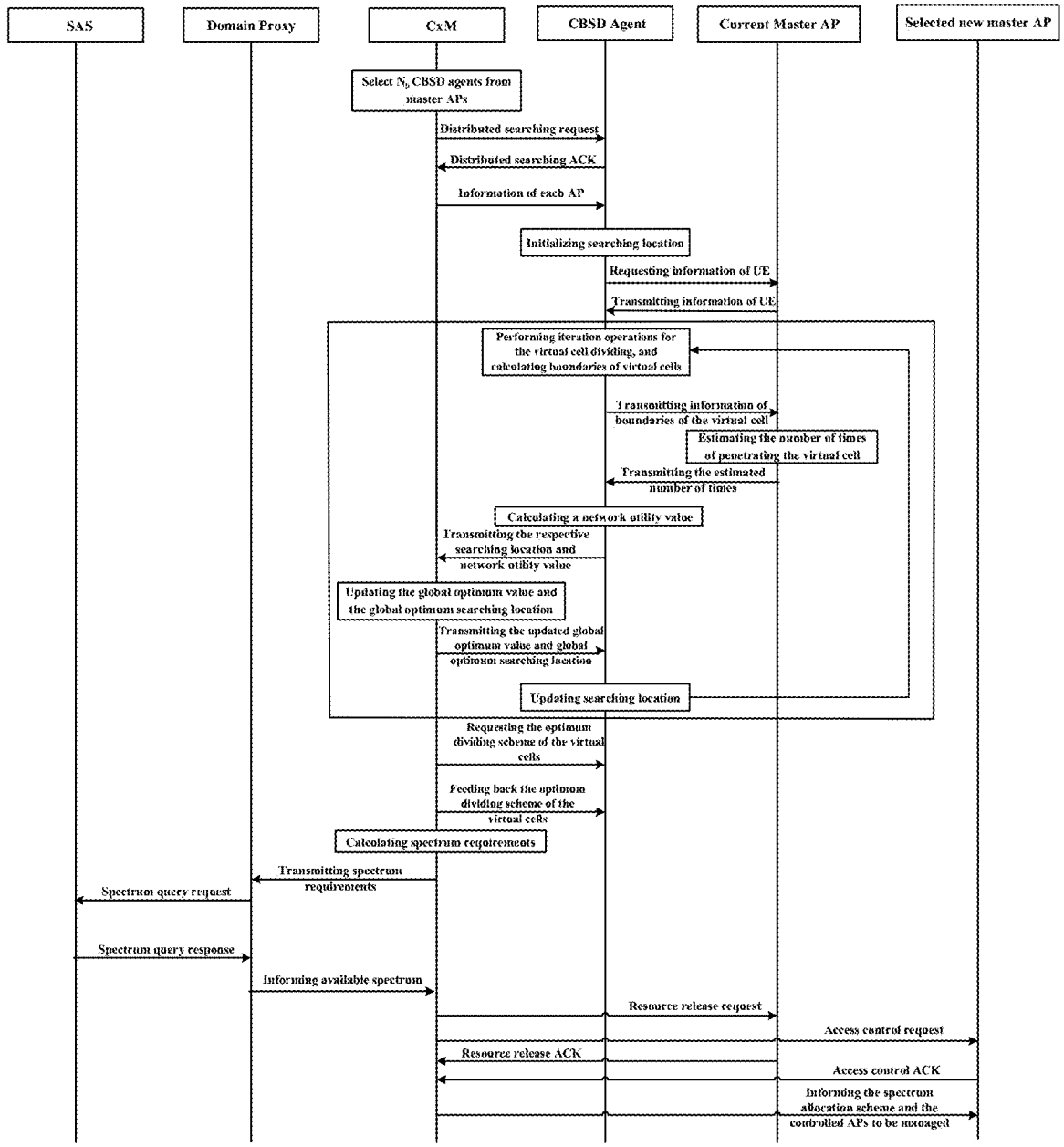
FIG. 6 is an exemplary schematic diagram showing another information procedure.

For ease of understanding, FIG. 6 shows an example of information procedure of the embodiment. Similar to that in the first embodiment, an electronic apparatus may be implemented on the CxM, and a master AP is implemented as the CBSD. The master AP as the searching node is implemented as a specific CBSD, which is referred to as CBSD agent below.

Firstly, the CxM selects $N_p$ searching nodes from among the current master APs as CBSD agents and sends a distributed searching request to the CBSD agents. The CBSD agents send a distributed searching ACK in response to the request. Next, the CxM sends information of each AP, for example, including locations, backhaul capacities of the APs and the like, to these CBSD agents. The CBSD agent initializes, for example, the searching location in a random manner and requests information of the UE to the current master AP, which includes, for example, backhaul requirement, location, and movement information of the user equipment, and the like. The current master AP acquires the information from the UE in its coverage range and sends the information to the CBSD agent in response to the request. It should be understood that the manner of acquiring the information described above is not limited, but other methods may be appropriately adopted, for example, all information is provided by the CxM, or all information is provided by the current master AP, and the like.

The CBSD agent uses the obtained information to perform iteration operations for the virtual cell dividing with respect to the current searching location. After the division of the virtual cells is completed, boundary information of the virtual cells are calculated and provided to the current master AP, such that the current master AP estimates the number of times for the UE penetrating the boundaries of the virtual cells, that is, estimates handover overhead of the UE in the coverage range of the current master AP. The current master AP sends the estimated handover overhead to the CBSD agent. It should be understood that, the CBSD agent may also estimate the handover overhead and calculate a network utility value by itself. For example, the CBSD agent calculates the network utility value based on the handover overhead as well as a packet loss ratio calculated based on backhaul capacity and backhaul requirement, and sends the current searching location and the calculated network utility value to the CxM.

The CxM updates the global optimum value of the network utility value and the global optimum searching location based on the obtained $N_p$ groups of data. For example, in the case that the algorithm does not converge, the CxM sends the updated global optimum value and global optimum searching location to the CBSD agent, such that the CBSD agent updates the searching location for the next iteration. The dashed line block shown in FIG. 6 represents the second iteration operation described above. In another aspect, in the case that the algorithm converges, the CxM requests the optimum dividing scheme of the virtual cells to the CBSD agent providing the final global optimum value, and the CBSD agent sends the optimum dividing scheme of the virtual cells to the CxM. The optimum dividing scheme of the virtual cells includes a master AP and controlled APs of each virtual cell. Alternatively, the optimum dividing scheme of the virtual cells may further include information of boundaries of each virtual cell.

Next, the CxM determines spectrum requirement of the virtual cell, for example based on the backhaul requirement and communication quality requirement of the virtual cell, and sends a spectrum request to the domain proxy. The domain proxy sends a spectrum query request to the SAS. Then, the SAS sends a spectrum query response to the domain proxy, such that the domain proxy informs the CxM of available spectrum resources. The CxM sends a resource release request to each of the current master APs and sends an access control request to the new master APs. Each of the current master APs sends a resource release acknowledgement (ACK) message to the CxM, and the new master APs send an access control ACK message to the CxM. Finally, the CxM sends information containing a spectrum allocation scheme and controlled APs to be managed, that is, the dividing scheme of the virtual cells, to the new master APs.

It should be understood that, the information procedure shown in FIG. 6 is only exemplary rather than restrictive, which may be modified or changed according to actual requirement and application scenario.

The electronic apparatus 100 according to the embodiment may dynamically determine the dividing scheme of the virtual cells in the predetermined region, such that the dividing scheme may be applicable to various scenarios flexibly, thereby ensuring communication quality. Since a distributed searching manner is adopted, real-time of determining the dividing scheme of the virtual cells is improved, thereby reducing the calculation load of the electronic apparatus 100.

Third Embodiment

Figure 7:
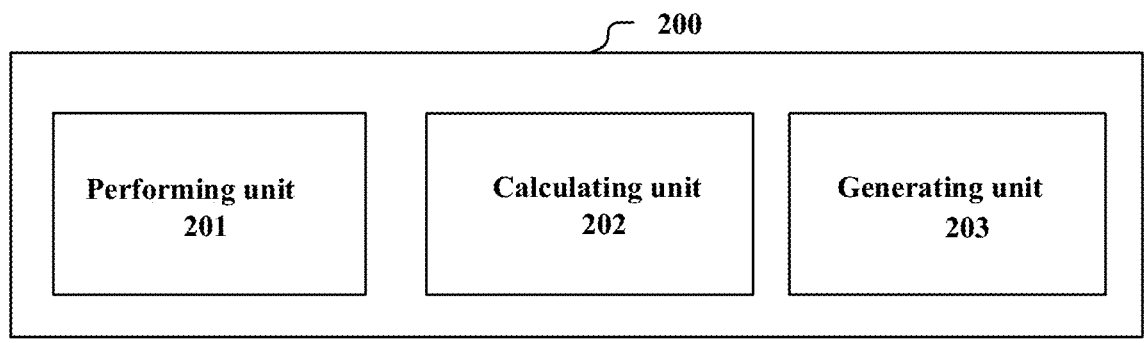
FIG. 7 is a block diagram showing functional modules of an electronic apparatus for wireless communications according to another embodiment of the present disclosure.

FIG. 7 is a block diagram showing functional modules of an electronic apparatus 200 for wireless communications according to another embodiment of the present disclosure. As shown in FIG. 7, the electronic apparatus 200 includes: a performing unit 201 configured to, in response to a distributed searching request from a central management apparatus, perform iteration operations for virtual cell dividing in a predetermined region with respect to a particular searching location, where the searching location is the number of divided virtual cells; a calculating unit 202 configured to calculate, based on a virtual cell division obtained when the iteration operations converge, a network utility value corresponding to the searching location, where the network utility value is a weighted sum of a function of a packet loss ratio for each virtual cell and a function of handover overhead in the predetermined region, where the packet loss ratio is obtained based on backhaul capacity of a master AP of a corresponding virtual cell and a total backhaul requirement of the virtual cell; and a generating unit 203 configured to generate a message containing the searching location and the network utility value, to report to the central management apparatus.

The performing unit 201, calculating unit 202 and generating unit 203 may be implemented by one or more processing circuitries, which may be implemented, for example, as a chip. Furthermore, although not shown in FIG. 7, the electronic apparatus 200 may further include a communicating unit for performing transceiving operation. The communicating unit may be, for example, implemented as an antenna or an antenna array and circuitry elements associated with the antenna or the antenna array. The electronic apparatus 200 may be, for example, located on a current master AP that is selected as a searching node, and may be, for example, implemented on a CBSD agent.

For example, the distributed searching request may include one of the following: initial information for determining an initial searching location as the particular searching location; a current global optimum searching location and its corresponding network utility value for determining the particular searching location.

Specifically, initially, the distributed searching request may include the initial searching location. In other words, the initial searching location is selected by the central management apparatus and provided to the electronic apparatus 200. Alternatively, initially, the distributed searching request may include a random seed, and the performing unit 201 generates an initial searching location by using the random seed. In the subsequent iteration operations, the distributed searching request includes a previous global optimum searching location and its corresponding network utility value updated by the central management apparatus. The performing unit 201 is configured to determine the particular searching location for the current iteration based on the current global optimum searching location and its corresponding network utility value as well as a searching location at the time of the previous iteration operation converging and the corresponding network utility value.

In order to perform the above operations, the electronic apparatus 200 may be further configured to acquire, from the central management apparatus, one or more of the following: a location of each AP, backhaul capacity of each AP, a backhaul requirement, location and movement information of user equipment. Alternatively, the electronic apparatus 200 may also acquire, from each of the current master APs, backhaul requirement, locations and movement information of user equipment in its coverage range.

For example, the performing unit 201 may perform the iteration operations as follows: select, according to the location and backhaul capacity of each AP, a first number of APs with the first number corresponding to the particular searching location as candidate APs for the master AP of each virtual cell; cluster the APs based on weighted distances between each AP and the candidate APs, where the weighted distance is a product of an actual distance between the AP and the candidate AP and a weighting factor based on the backhaul capacity of the candidate AP; and with respect to each cluster, update the candidate AP for the cluster, and re-perform the clustering based on the weighted distances using the updated candidate APs until a predetermined condition is satisfied, taking the candidate APs of clusters finally obtained as the master APs of virtual cells.

The predetermined condition may include one or more of the following: variation of the location of the candidate AP between two clustering operations is below a predetermined degree; the number of times of performing clustering operations achieves a predetermined value. The performing unit 201 may allocate an access point to a cluster whose candidate access point is corresponding to the smallest weighted distance.

The performing unit 201 is further configured to set a weighting factor, such that the stronger backhaul capacity the candidate access point has, the more tendency there is to allocate an access point to the cluster for the candidate access point, and the larger backhaul requirement the user equipment around the candidate access point have, the less tendency there is to allocate the access point to the cluster for the candidate access point. For example, the weighting factor may be a normalized value of a ratio between an estimated backhaul requirement of user equipment around the candidate AP and the backhaul capacity of the candidate AP.

Furthermore, the calculating unit 202 may be configured to get, based on the finally obtained clustering result, boundaries of each virtual cell by using a Voronoi Diagram. In one example, the calculating unit 202 is configured to estimate, based on the boundaries and movement information of the user equipment, handover overhead between virtual cells, so as to obtain the handover overhead in the predetermined region.

In another example, the information of boundaries may be further provided to current master APs, such that each of the current master APs estimate, based on movement information of the user equipment, handover overhead due to movement of user equipment in its coverage range. The calculating unit 202 acquires the information of handover overhead from current master APs, and estimates the handover overhead in the predetermined region based on the information of the handover overhead. Then, the calculating unit 202 calculates the network utility value for example based on the handover overhead and the packet loss ratio calculated based on the backhaul capacity and backhaul requirement.

Furthermore, the electronic apparatus 200 may further acquire the finally determined dividing scheme of the virtual cells from the central management apparatus, and the dividing scheme of the virtual cells includes one or more of the following: the master AP of the virtual cell, the controlled APs of the virtual cell and information of boundaries of the virtual cell. In another aspect, the electronic apparatus 200 may further acquire information of spectrum allocation scheme from the central management apparatus.

The above contents about iteration operations for the division of virtual cells, calculation of network utility values, and information interaction with the central management apparatus and the like have been described in detail in the first embodiment and second embodiment, which are not repeated herein.

The electronic apparatus 200 according to the embodiment may perform the determination of the dividing scheme of the virtual cells in response to the request of the central management apparatus, such that the dividing scheme may be flexibly applicable to various scenarios, thereby improving the real-time of determining the dividing scheme of the virtual cells, and thus reducing the calculation load of the central management apparatus.

A schematic simulation example to which the technology of the present disclosure is applied is given below.

Figure 8:
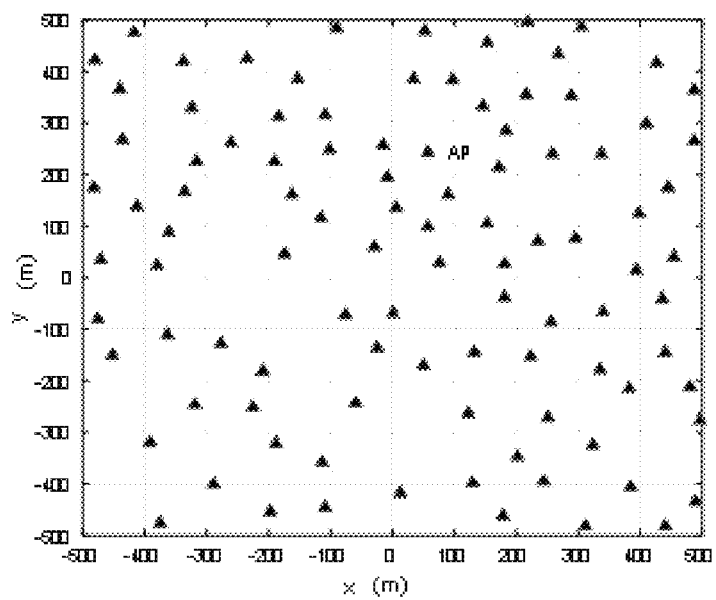
FIG. 8 is a diagram showing a scenario of APs in a given region used in a simulation example.
Figure 9:
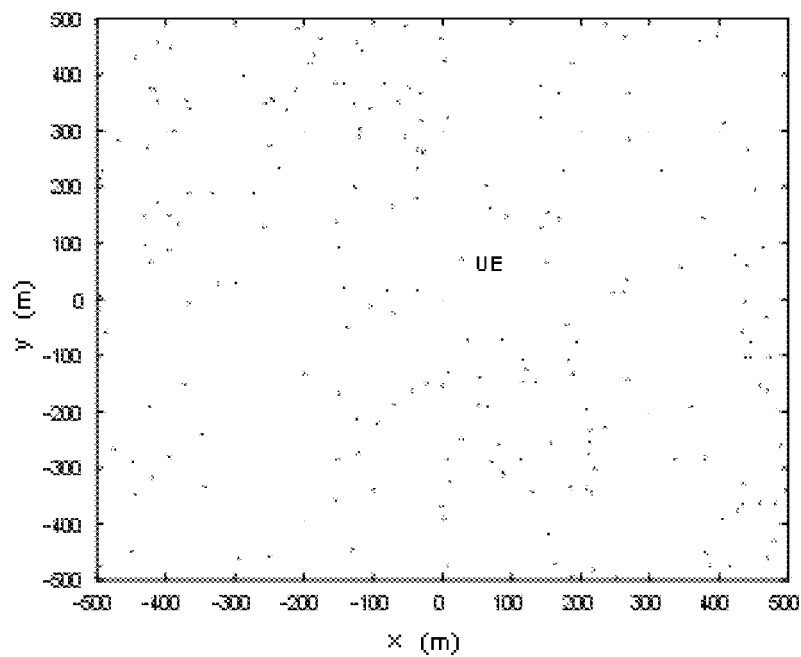
FIG. 9 shows an example of a scenario diagram of UE generated randomly.

FIG. 8 is a schematic diagram showing a scenario of APs in a given region, which is generated by a hard core point process (HCPP). A distance between two APs may not be smaller than $r_h$, that is, the condition $\forall x_i, x_j \in \Pi, i \neq j, \|x_i - x_j\| \geq r_h$ is satisfied, and $\Pi$ is a point set of locations of all of the APs in the region. FIG. 9 is a schematic diagram showing a scenario of UE generated randomly. It is assumed that each of the current master APs may effectively estimate the number of times of the active user equipment penetrating the boundaries in its virtual cell range based on instant speed of the user equipment, historical movement data of the user equipment, street information and the like.

Figure 10:
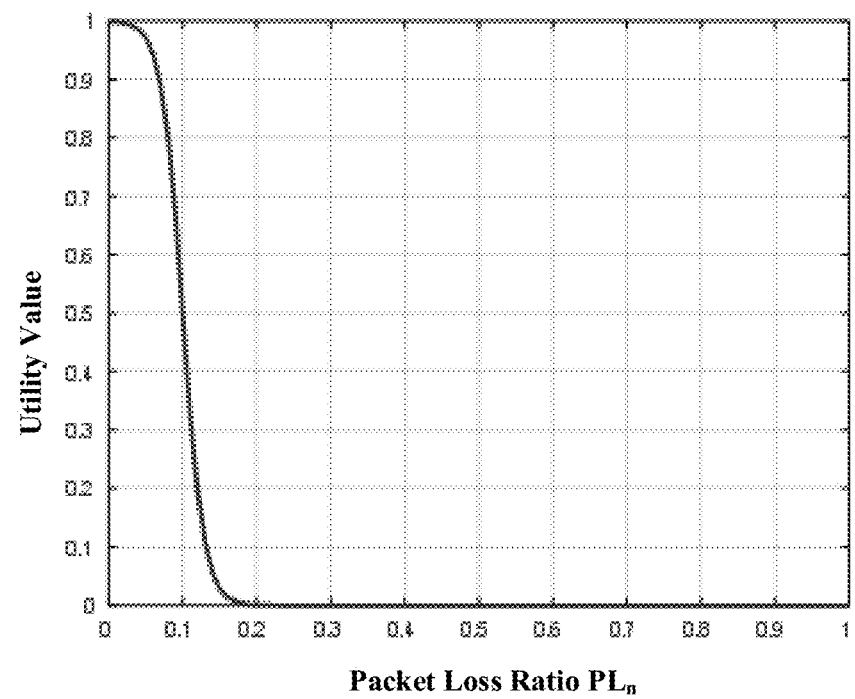
FIG. 10 is a graph showing an example of a utility function of a packet loss ratio for a virtual cell.
Figure 11:
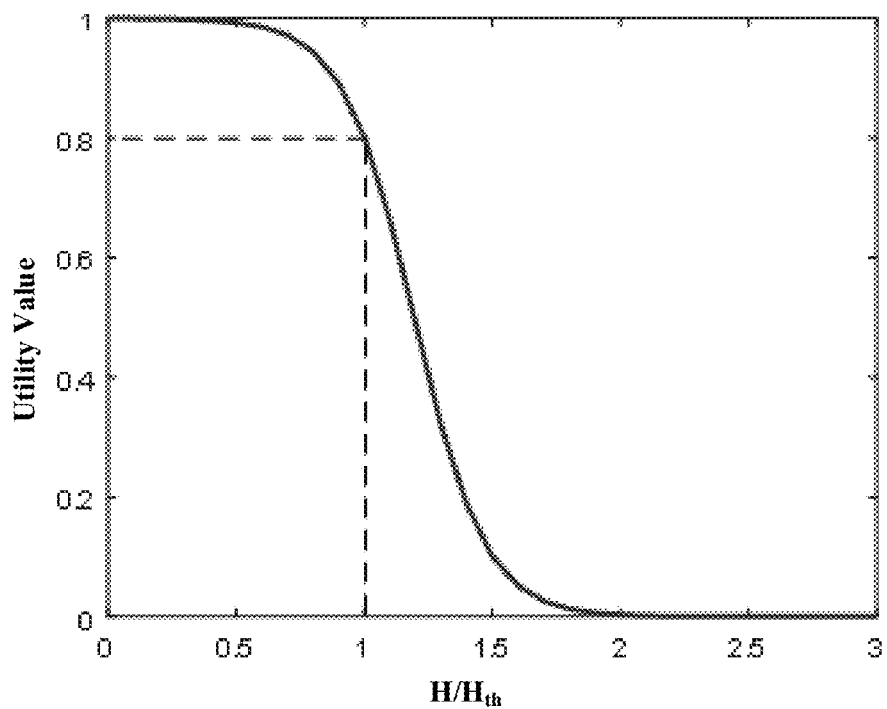
FIG. 11 is a graph showing an example of a utility function of handover overhead due to handover among virtual cells.

It is assumed that the following formula (5) is used as the representation of utility function of the packet loss ratio of the n-th virtual cell, and the following formula (6) is used as the representation of utility function of handover overhead among the virtual cells. FIGS. 10 and 11 show graphs of these two functions, respectively.

$$f_1(PL_n) = \frac{1}{2}\{\tanh[s_1(h_1 - PL_n)] + 1\} \quad (5)$$

$$f_2(H) = \frac{1}{2}\left\{\tanh\left[s_2\left(h_2 - \frac{H}{H_{th}}\right)\right] + 1\right\} \quad (6)$$

In the formulas (5) and (6), $s_1$, $s_2$ are expansion factors, $h_1$, $h_2$ are symmetric centers, H is the estimated total number of times of handover among the virtual cells, and $H_{th}$ is the threshold of the number of times of handover among the virtual cells, which is set to 0.3 times the number of UE in the simulation.

In the simulation, the distributed searching manner described in the second embodiment is adopted, and parameters are set as follows. The simulation area is 1 km×1 km, the number of APs is 100, the minimum distance between APs ($r_h$) is 60 m, backhaul capacity of the AP is 30 to 100 Mbps, the number of UE is 200, the number of searching nodes is 3; weight a in calculation of network utility value (see the formula (1)) is 0.5, weight b in calculation of network utility value (see the formula (1)) is 0.5, the expansion factor $s_1$ is 35.3231, the symmetric center $h_1$ is 0.1, the expansion factor $s_2$ is 3.5834, the symmetric center $h_2$ is 1.1946, and $H_{th}$ is 60.

Figure 12:
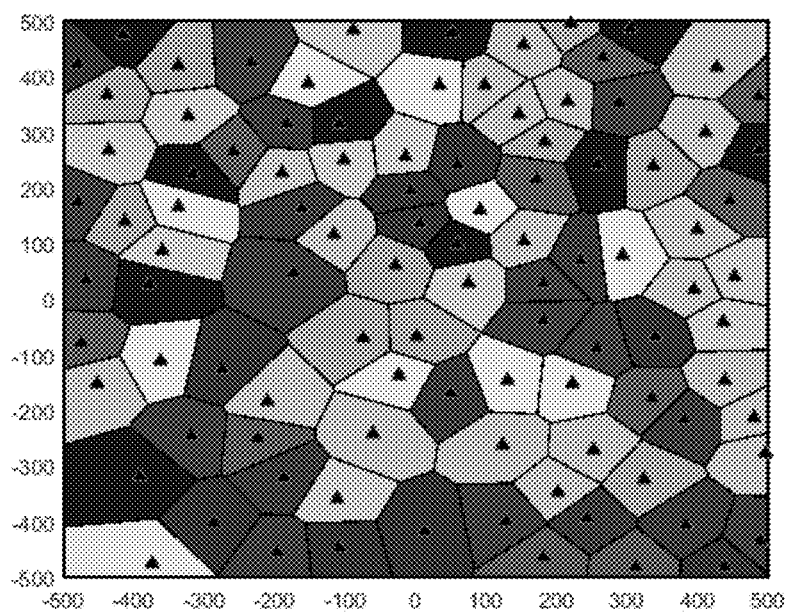
FIG. 12 is a schematic diagram showing boundaries of each AP generated with Voronoi diagram in a scenario of the APs in FIG. 8.
Figure 13:
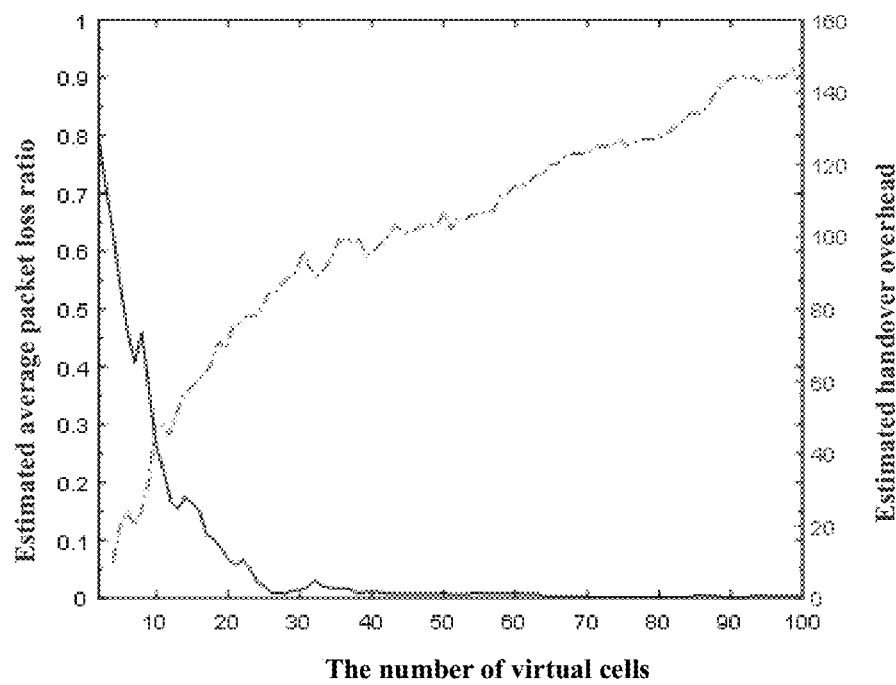
FIG. 13 is a graph showing estimated average packet loss ratio for virtual cells and estimated handover overhead among virtual cells under all the possible numbers of virtual cells obtained by adopting the existing exhaustive searching method.

FIG. 12 shows boundaries of each AP generated with Voronoi diagram in a scenario of the APs in FIG. 8. FIG. 13 is a graph of estimated average packet loss ratio for virtual cells and estimated handover overhead (that is, the number of times of handover) among virtual cells under all the possible numbers of virtual cells obtained by adopting the existing exhaustive searching method. As described above, with the increase of the number of the virtual cells, the average packet loss ratio of the network gradually decreases, but the handover overhead among the virtual cells gradually increases.

Figure 14:
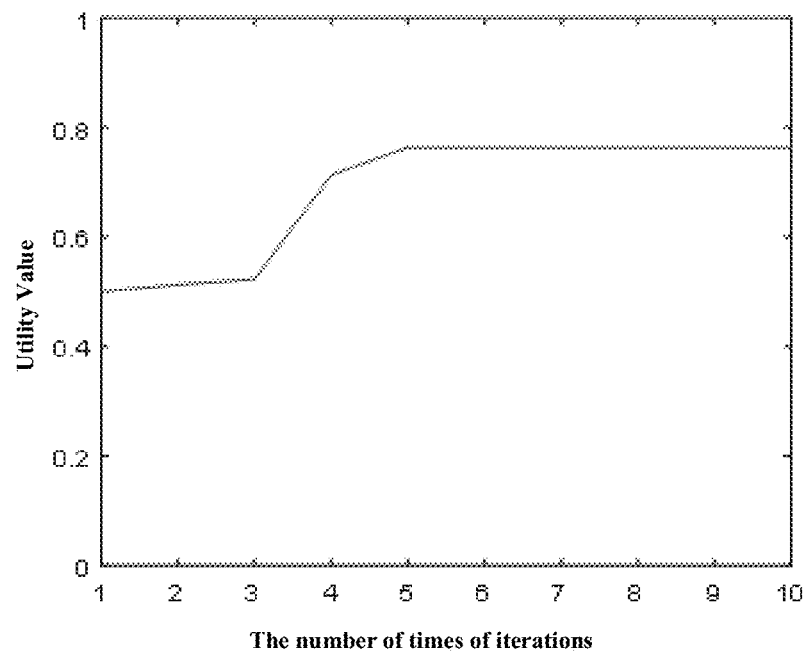
FIG. 14 is a graph showing a network utility curve obtained by searching according to the technology of the present disclosure.
Figure 15:
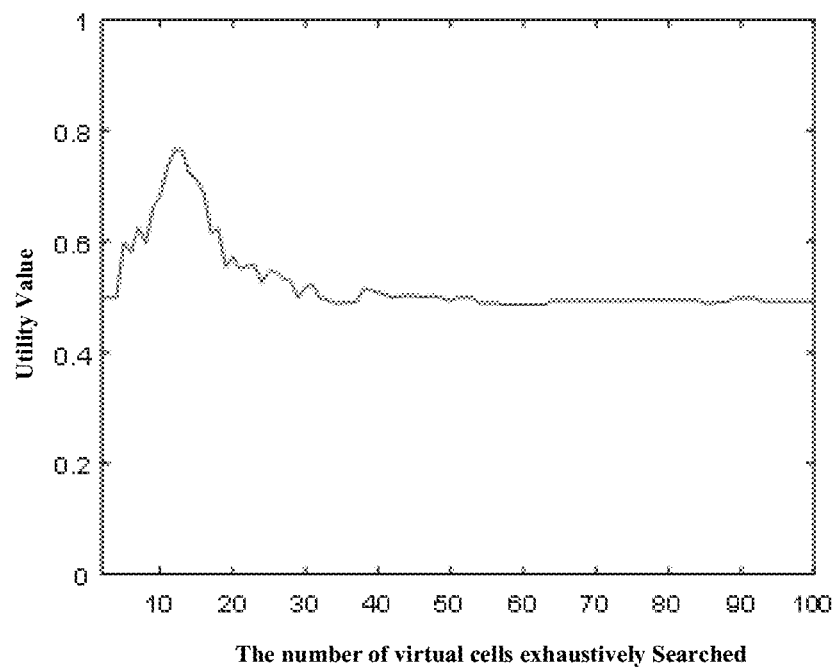
FIG. 15 is a graph showing a utility curve obtained by adopting an exhaustive searching method.

FIG. 14 is a graph of a network utility curve obtained by adopting a distributed searching algorithm (which is also referred to as a particle swarm optimization (PSO) optimization algorithm-based distributed iterative algorithm) of the present disclosure, and FIG. 15 is a graph of a utility curve obtained by adopting an exhaustive searching method. As can be seen by comparison, the distributed searching algorithm of the present disclosure may reach the optimum utility value of the exhaustive searching by means of a few iterations.

Figure 16:
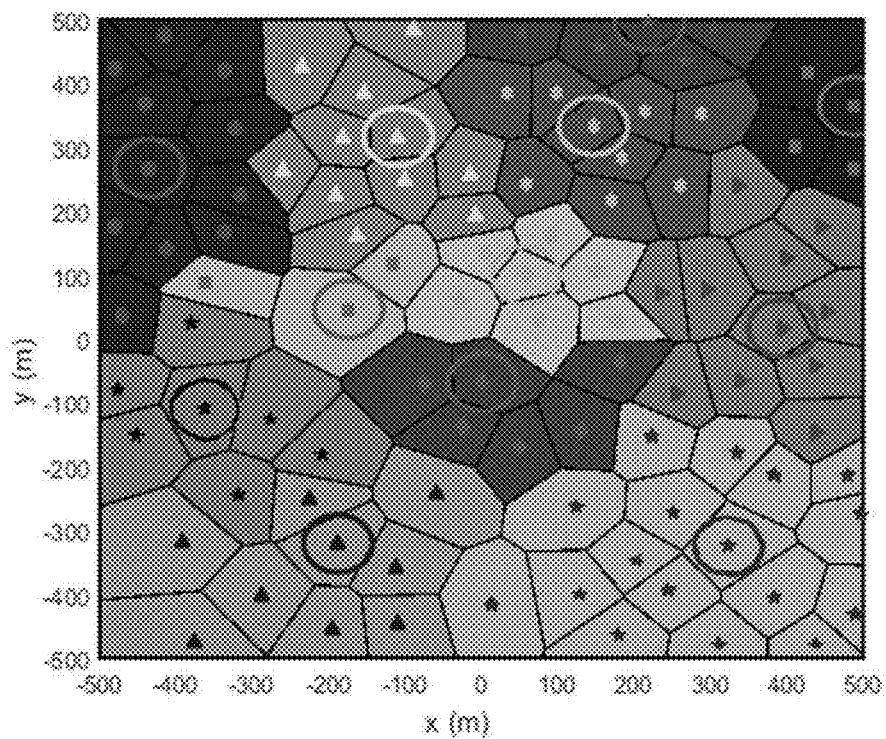
FIG. 16 is a schematic diagram showing an optimum dividing scheme of virtual cells obtained by adopting the technology of the present disclosure.

FIG. 16 shows an optimum dividing scheme of virtual cells obtained by adopting a distributed searching algorithm of the present disclosure. The APs circled by circles are master APs determined using the algorithm of the present disclosure, each of which constitutes a virtual cell with APs having the same gray scale and represented by icons of the same shape around it. In addition, FIG. 16 shows boundaries of the virtual cells obtained using the Voronoi diagram.

It should be understood that the above simulation example is only exemplary and does not intend to limit the present disclosure.

Fourth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 17:
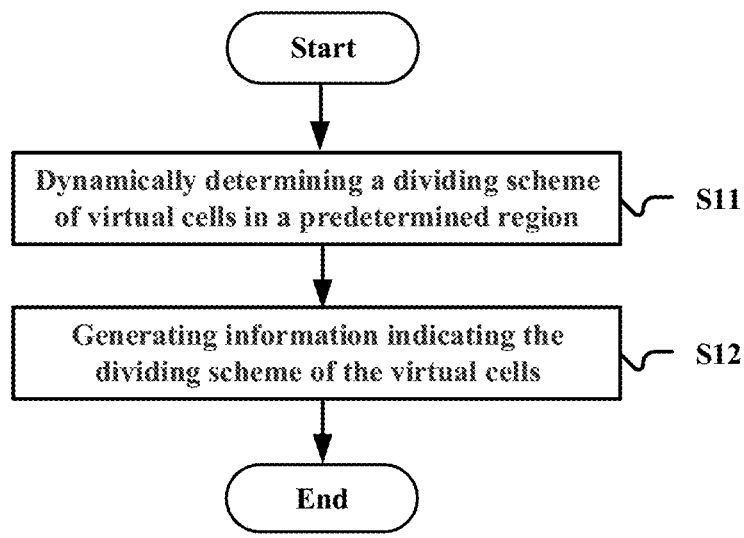
FIG. 17 is a flowchart of a method for wireless communications according to an embodiment of the present disclosure.

FIG. 17 is a flowchart of a method for wireless communications according to an embodiment of the present disclosure. The method includes: determining a dividing scheme of virtual cells in a predetermined region in a dynamical manner (S11), determining the dividing scheme of the virtual cells including dividing multiple access points into one or more virtual cells and specifying an AP in each virtual cell as a master AP; and generating a message indicating the dividing scheme of the virtual cells to inform the specified master APs (S12).

For example, steps S11 and S12 may be performed in response to one or more of the following: handover overhead of one or more current virtual cells exceeds a predetermined overhead threshold; backhaul requirement of one or more current virtual cells exceeds a backhaul capacity threshold of the respective virtual cells; and a predetermined period of time elapses.

In one example, the dividing scheme of the virtual cells may be determined based on one or more of the following: backhaul capacity of master APs of the virtual cells; and handover overhead due to handover of user equipment among virtual cells.

For example, the dividing scheme of the virtual cells may be determined, such that a network utility value is the highest in the case of adopting the dividing scheme. The network utility value is, for example, related to packet loss ratios of respective virtual cells and the handover overhead in the predetermined region, where the packet loss ratio is obtained based on backhaul capacity of a master AP of the corresponding virtual cell and a total backhaul requirement of the virtual cell.

In order to perform process of S11, one or more of the following may be acquired from current master APs: a location of each AP, backhaul capacity of each AP, a backhaul requirement, location and movement information of user equipment within coverage range of a corresponding virtual cell.

Figure 18:
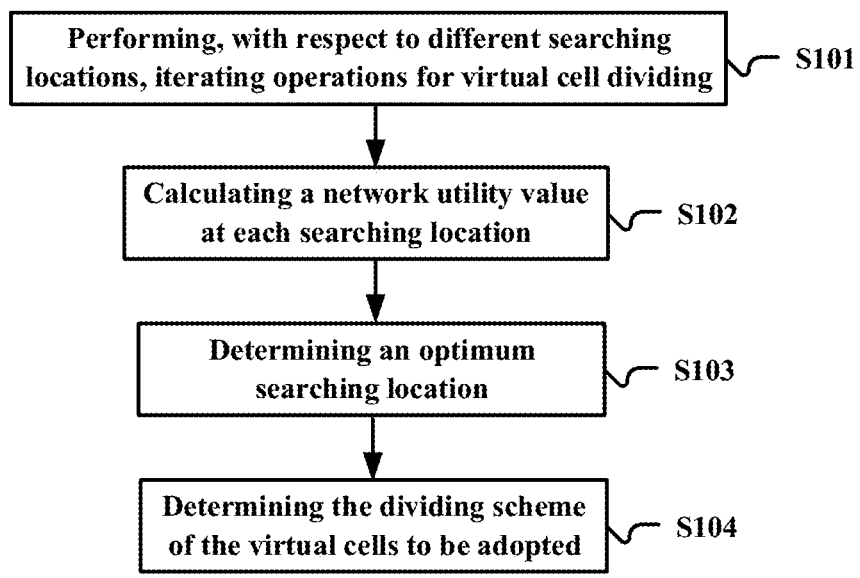
FIG. 18 is a flowchart showing an example of step S11 in FIG. 17.

FIG. 18 is a flowchart showing one example of step S11. As shown in FIG. 18, step S11 includes: taking the number of the divided virtual cells as a searching location, and performing, with respect to different searching locations, iterating operations for virtual cell dividing (S101); calculating, based on a virtual cell division obtained when the iteration operations complete, a network utility value corresponding to the searching location (S102); optimizing the searching location at which to perform the iteration operations based on the network utility value, to determine an optimum searching location (S103); and determining the dividing scheme of the virtual cells corresponding to the optimum searching location as the dividing scheme of the virtual cells to be adopted (S104).

For example, step S101 may include: selecting, according to the location and backhaul capacity of each AP, a first number of APs with the first number corresponding to the searching location as candidate APs for the master AP of each virtual cell; clustering the APs based on weighted distances between each AP and the candidate APs, where the weighted distance is related to an actual distance between the AP and the candidate AP, and a weighting factor based on the backhaul capacity of the candidate AP; and with respect to each cluster, updating the candidate AP for the cluster, and re-performing the clustering based on the weighted distances using the updated candidate APs until a predetermined condition is satisfied, taking the candidate APs of clusters finally obtained as the master APs of virtual cells.

The predetermined condition may include one or more of the following: variation of the location of the candidate AP between two clustering operations is below a predetermined degree; the number of times of performing clustering operations achieves a predetermined value. For example, an access point may be allocated to a cluster whose candidate access point is corresponding to the smallest weighted distance.

In one example, the weighting factor may be set, such that a probability for an AP being allocated to a cluster whose candidate AP has stronger backhaul capacity is larger than a probability for the AP being allocated to a cluster whose candidate AP has weaker backhaul capacity; and a probability for an AP being allocated to a cluster whose candidate AP has user equipment with a larger backhaul requirement around it is smaller than a probability for the AP being allocated to a cluster whose candidate AP has user equipment with a smaller backhaul requirement around it. For example, the weighting factor is a normalized value of a ratio between an estimated backhaul requirement of user equipment around the candidate AP and the backhaul capacity of the candidate AP.

In step S102, boundaries of each virtual cell may be obtained based on the finally obtained clustering result, and handover overhead between virtual cells is estimated, based on the boundaries and movement information of the user equipment.

Figure 19:
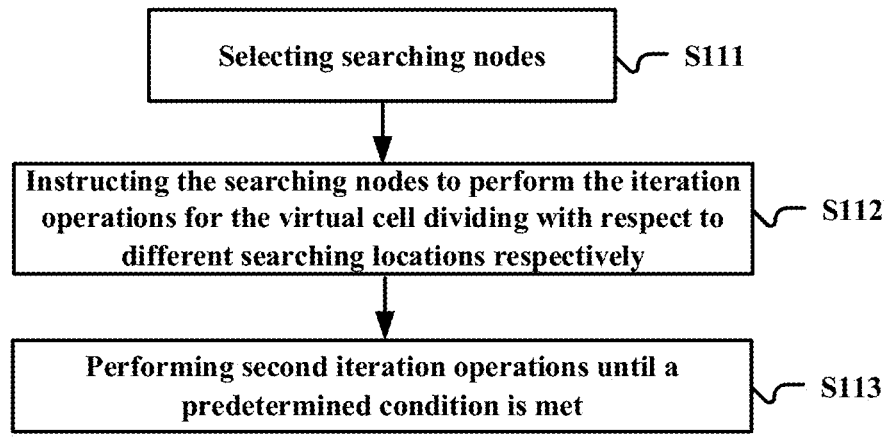
FIG. 19 is a flowchart showing another example of step S11 in FIG. 17.

FIG. 19 is a flowchart showing another example of step S11. As shown in FIG. 19, step S11 includes: selecting, according to a current load of each master AP, a predetermined number of master APs as searching nodes (S111); instructing the searching nodes to perform the iteration operations for the virtual cell dividing with respect to different searching locations respectively (S112), where the searching location is the number of divided virtual cells; performing following second iteration operations, until a predetermined condition is met: acquire, from each of the searching nodes, a network utility value of the dividing scheme of the virtual cells for a corresponding searching location, and determine a global optimum searching location based on the network utility values; and provide the global optimum searching location and its corresponding network utility value to the searching nodes, such that each searching node updates the searching location for next iteration operation, based on the global optimum searching location and its corresponding network utility value as well as a previous searching location and the corresponding network utility value for the searching node (S113).

For example, the predetermined condition may include one or more of the following: the global optimum searching location is no longer changed; variation of the network utility value corresponding to the global optimum searching location between two second iteration operations is below a predetermined degree; the number of times of performing the second iteration operations achieves a predetermined value.

Furthermore, although not shown in FIG. 19, the above method may further include: acquiring, from a searching node providing the final global optimum searching location, the dividing scheme of the virtual cells corresponding to the final global optimum searching location, where the dividing scheme of the virtual cells may further include information of boundaries of the virtual cells.

Step S112 may further include generating a distributed searching request to be provided to the selected searching nodes, and acquiring a response to the distributed searching request from the searching nodes.

For example, one or more of the following may be provided to the searching nodes: a location of each AP, backhaul capacity of each AP, backhaul requirement, location and movement information of user equipment.

Furthermore, the above method may further include determining, based on the determined backhaul requirement and communication quality requirement of each virtual cell, spectrum requirement of the virtual cell, and determining a spectrum allocation scheme according to the spectrum requirements. And, a message containing the spectrum allocation scheme may be generated to inform the master APs.

For example, the above method may be performed at a central management apparatus side. The above method may further include interacting with another central management apparatus, to obtain information of APs in the predetermined region which are managed by the another central management apparatus and/or providing information of APs managed by the present central management apparatus to the another central management apparatus.

Figure 20:
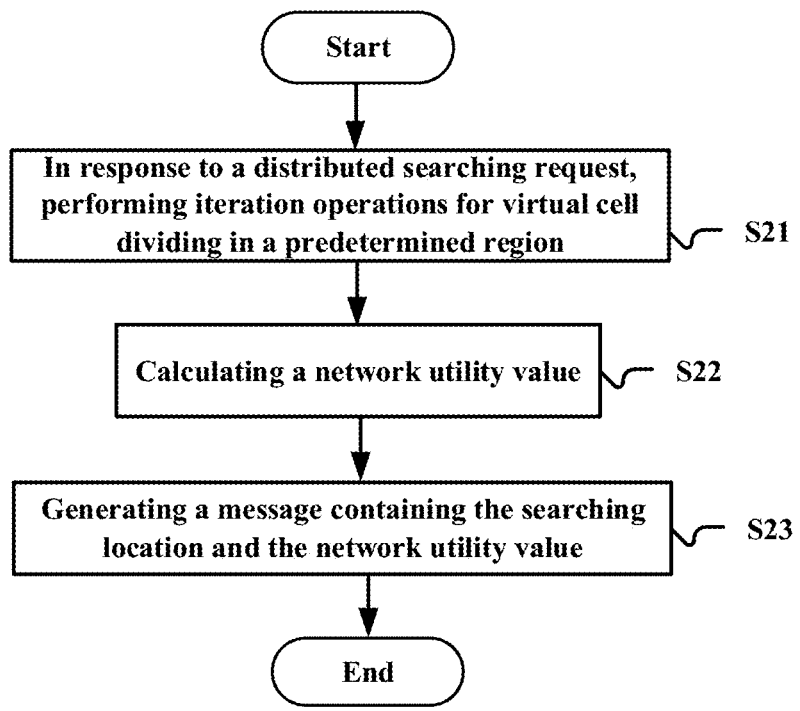
FIG. 20 is a flowchart showing a method for wireless communications according to another embodiment of the present disclosure.

FIG. 20 is a flowchart showing a method for wireless communications according to another embodiment of the present disclosure. The method includes: in response to a distributed searching request from a central management apparatus, performing iteration operations for virtual cell dividing in a predetermined region with respect to a particular searching location (S21), where the searching location is the number of divided virtual cells; calculating, based on a virtual cell division obtained when the iteration operations converge, a network utility value corresponding to the searching location (S22), where the network utility value is related to packet loss ratios of respective virtual cells and the handover overhead in the predetermined region, where the packet loss ratio is obtained based on backhaul capacity of a master AP of a corresponding virtual cell and a total backhaul requirement of the virtual cell; and generating a message containing the searching location and the network utility value, to report to the central management apparatus (S23).

For example, the distributed searching request may include one of the following: initial information for determining an initial searching location as the particular searching location; a current global optimum searching location and its corresponding network utility value for determining the particular searching location. In the case that the distributed searching request includes the current global optimum searching location and its corresponding network utility value, the particular searching location is determined based on the global optimum searching location and its corresponding network utility value as well as a searching location at the time of the previous iteration operation converging and the corresponding network utility value.

In FIG. 20, the iteration operation in step S21 is substantially the same as the iteration operation described with reference to step S101 of FIG. 18, which is not repeated herein.

In step S22, boundaries of each virtual cell may be obtained based on the obtained master AP by using, for example, the Voronoi diagram, and handover overhead of each virtual cell may be estimated based on the boundaries and movement information of the user equipment, to obtain the handover overhead in the predetermined region.

Alternatively, the information of boundaries may be further provided to current master APs, such that each of the current master APs estimate, based on movement information of user equipment, handover overhead due to movement of user equipment in its coverage range. The information of handover overhead is acquired from current master APs, and the handover overhead in the predetermined range is estimated based on the information of the handover overhead.

Furthermore, although not shown in FIG. 20, the above method may further include: acquiring the finally determined dividing scheme of the virtual cells from the central management apparatus, and the dividing scheme of the virtual cells includes one or more of: the master AP of the virtual cell, the controlled APs and the virtual cell and information of boundaries of the virtual cell. The above method may further include acquiring information of spectrum allocation scheme from the central management apparatus.

It should be noted that, the above methods may be performed separately or in combination with each other, and the details thereof are described in the first to the third embodiments, which are not repeated herein.

The technology of the present disclosure may be applied to various products. For example, the electronic apparatus 100 may be implemented as any type of server, such as a tower server, a rack server, and a blade server. The electronic apparatus 100 may be a control module mounted on a server (such as an integrated circuit module including a single wafer, and a card or a blade inserted into a slot of the blade server).

APPLICATION EXAMPLE REGARDING A SERVER

Figure 21:
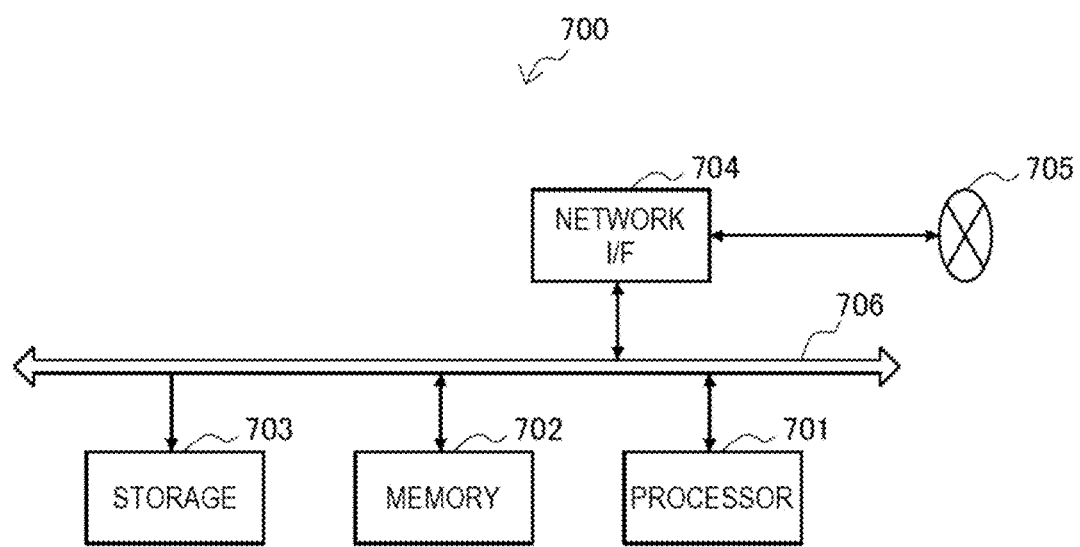
FIG. 21 is a block diagram showing an example of a schematic configuration of a server 700 to which the technology of the present disclosure may be applied.

FIG. 21 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be for example a central processing unit (CPU) or a digital signal processor (DSP), and control functions of the server 700. The memory 702 includes a random access memory (RAM) and a read-only memory (ROM), and stores a program that is executed by the processor 701, and data. The storage 703 may include a memory medium, such as a semiconductor memory and a hard disc.

The network interface 704 is a communication interface for connecting the server 700 to a communication network 705. The communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high-speed bus and a low-speed bus), each of which has different speed.

In the server 700 shown in FIG. 21, the determining unit 101 and the generating unit 102 and the like described with reference to FIG. 1 may be implemented by the processor 701. For example, the processor 701 may determine the dividing scheme of the virtual cells in the predetermined region by performing the functions of the determining unit 101 and the generating unit 102.

APPLICATION EXAMPLE REGARDING A BASE STATION

First Application Example

Figure 22:
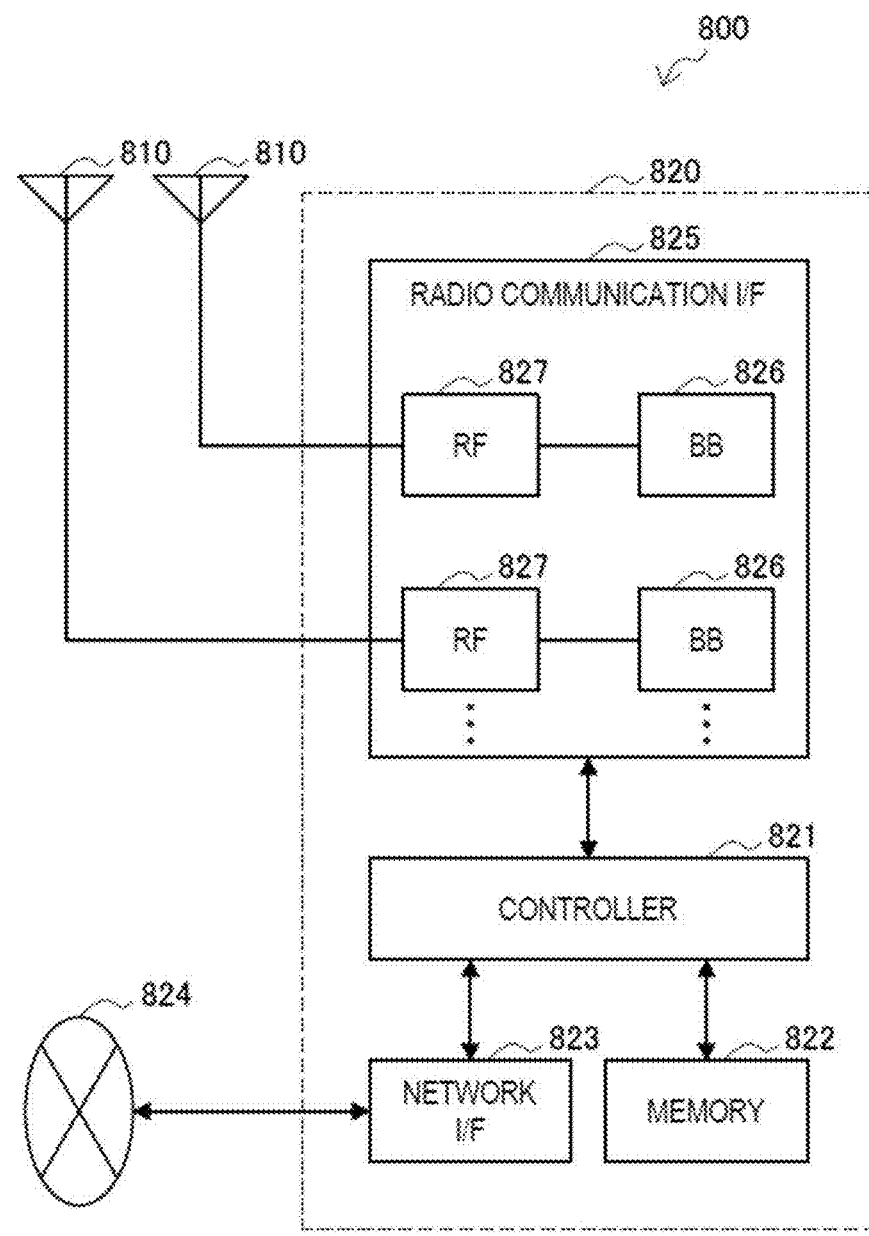
FIG. 22 is a block diagram showing a first example of a schematic configuration of an eNB or gNB to which the technology of the present disclosure may be applied.

FIG. 22 is a block diagram showing a first example of a schematic configuration of an eNB or gNB to which the technology of the present disclosure may be applied. It should be noted that, the following description is given by taking the eNB as an example, but the following description may also be applied to the gNB. An eNB 800 includes one or more antennas 810 and a base station apparatus 820. The base station apparatus 820 and each of the antennas 810 may be connected to each other via a radio frequency (RF) cable. Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 22, the eNB 800 may include the multiple antennas 810. For example, the multiple antennas 810 may be compatible with multiple frequency bands used by the eNB 800. Although FIG. 22 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 22, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 22. For example, the multiple RF circuits 827 may be compatible with multiple antenna elements. Although FIG. 22 shows the example in which the radio communication interface 825 includes the multiple BB processors 826 and the multiple RF circuits 827, the radio communication interface 825 may also include a single BB processor 826 and a single RF circuit 827.

Second Application Example

Figure 23:
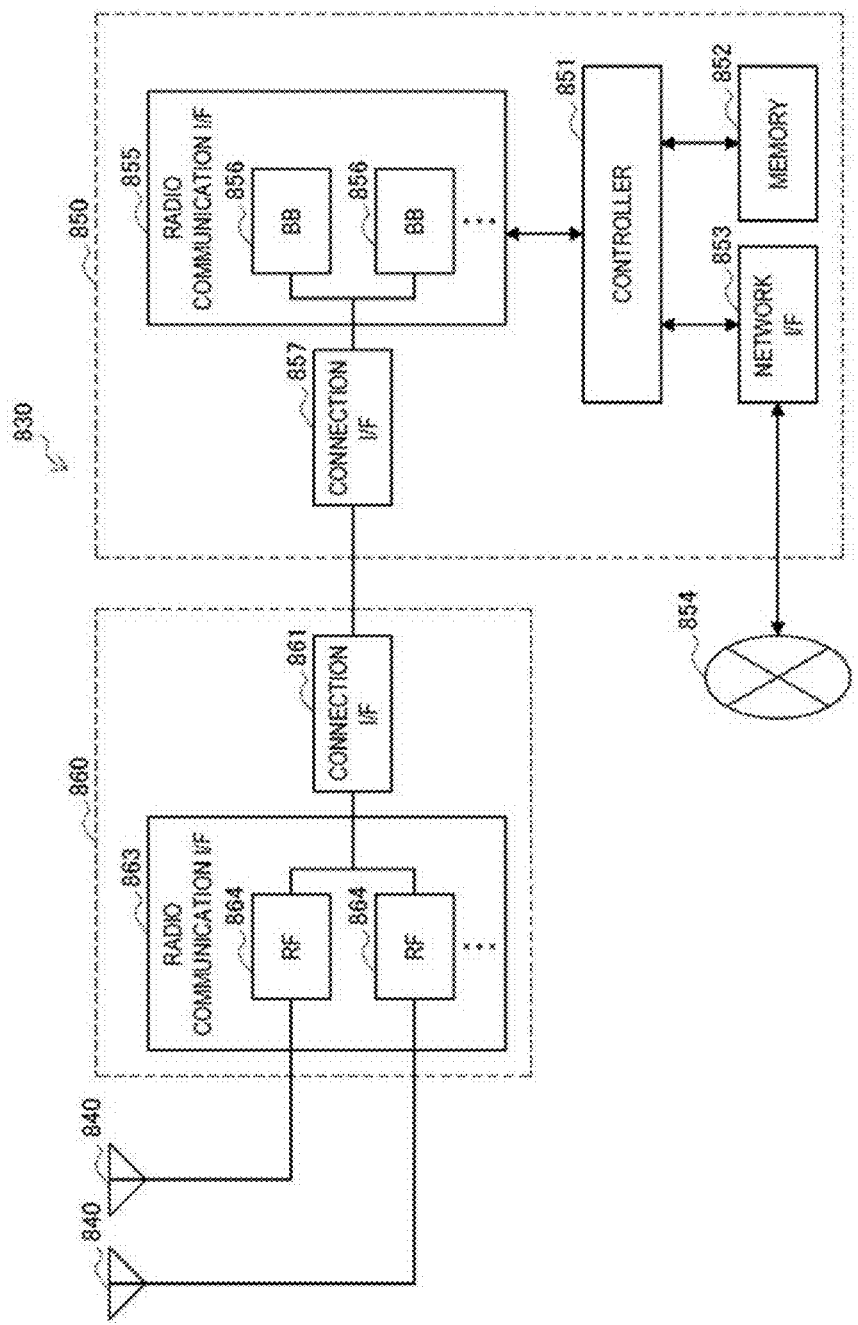
FIG. 23 is a block diagram showing a second example of a schematic configuration of an eNB or gNB to which the technology of the present disclosure may be applied.

FIG. 23 is a block diagram showing a second example of a schematic configuration of an eNB to which the technology of the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 23, the eNB 830 may include the multiple antennas 840. For example, the multiple antennas 840 may be compatible with multiple frequency bands used by the eNB 830. Although FIG. 23 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 22.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 22, except that the BB processor 856 is connected to an RF circuit 864 of the RRH 860 via the connection interface 857. As show in FIG. 23, the radio communication interface 855 may include the multiple BB processors 856. For example, the multiple BB processors 856 may be compatible with multiple frequency bands used by the eNB 830. Although FIG. 23 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 23. For example, the multiple RF circuits 864 may support multiple antenna elements. Although FIG. 23 shows the example in which the radio communication interface 863 includes the multiple RF circuits 864, the radio communication interface 863 may also include a single RF circuit 864.

In the eNB 800 shown in FIG. 22 and the eNB 830 shown in FIG. 23, the transceiving unit described in the third embodiment may be implemented by the radio communication interface 825 and the radio communication interface 855 and/or the radio communication interface 863. At least a part of the functions may be implemented by a controller 821 and a controller 851. The performing unit 201, the calculating unit 202 and the generating unit 203 described with reference to FIG. 7 may be implemented by the controller 821 and the controller 851. For example, the controller 821 and the controller 851 may perform a determination of the dividing scheme of the virtual cells at a particular searching location and a calculation of a corresponding network utility value by performing the functions of the performing unit 201, the calculating unit 202, and the generating unit 203.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2400 shown in FIG. 24) from a storage medium or network, wherein the computer is capable of implementing various functions when installed with various programs.

Figure 24:
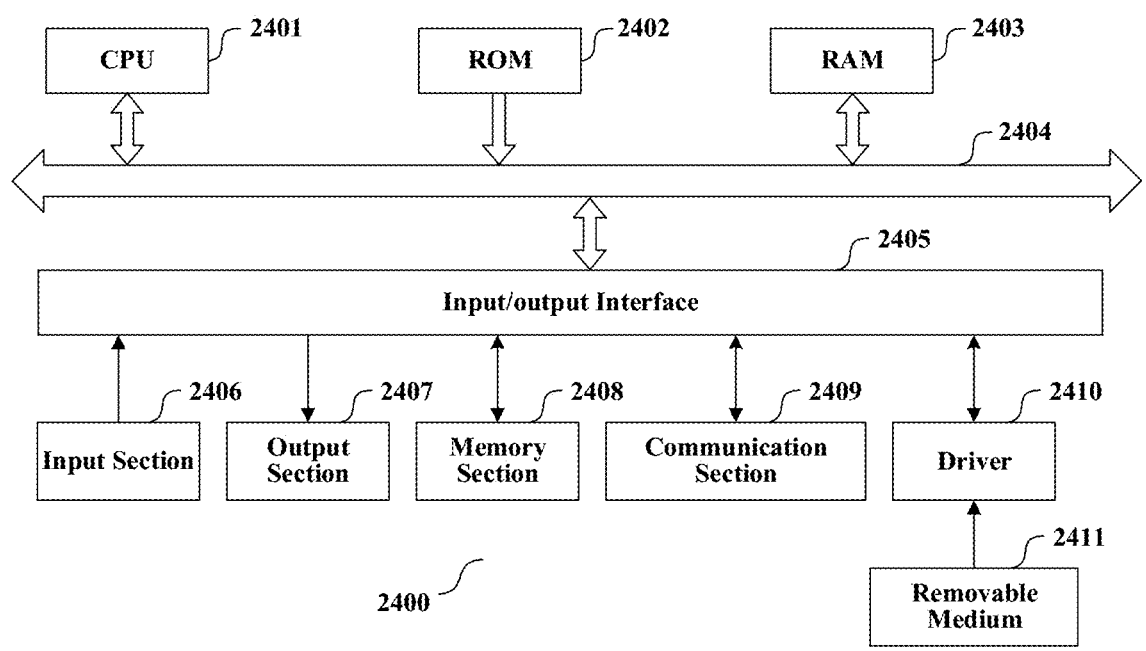
FIG. 24 is a block diagram of an exemplary block diagram illustrating the structure of a general purpose personal computer capable of realizing the method and/or device and/or system according to the embodiments of the present disclosure.

In FIG. 24, a central processing unit (CPU) 2401 executes various processing according to a program stored in a read-only memory (ROM) 2402 or a program loaded to a random access memory (RAM) 2403 from a memory section 2408. The data needed for the various processing of the CPU 2401 may be stored in the RAM 2403 as needed. The CPU 2401, the ROM 2402 and the RAM 2403 are linked with each other via a bus 2404. An input/output interface 2405 is also linked to the bus 2404.

The following components are linked to the input/output interface 2405: an input section 2406 (including keyboard, mouse and the like), an output section 2407 (including displays such as a cathode ray tube (CRT), a liquid crystal display (LCD), a loudspeaker and the like), a memory section 2408 (including hard disc and the like), and a communication section 2409 (including a network interface card such as a LAN card, modem and the like). The communication section 2409 performs communication processing via a network such as the Internet. A driver 2410 may also be linked to the input/output interface 2405, if needed. If needed, a removable medium 2411, for example, a magnetic disc, an optical disc, a magnetic optical disc, a semiconductor memory and the like, may be installed in the driver 2410, so that the computer program read therefrom is installed in the memory section 2408 as appropriate.

In the case where the foregoing series of processing is achieved through software, programs forming the software are installed from a network such as the Internet or a memory medium such as the removable medium 2411.

It should be appreciated by those skilled in the art that the memory medium is not limited to the removable medium 2411 shown in FIG. 24, which has program stored therein and is distributed separately from the apparatus so as to provide the programs to users. The removable medium 2411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2402 and the memory section 2408 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   determine a dividing scheme of virtual cells in a predetermined region in a dynamical manner, determining the dividing scheme of the virtual cells comprising dividing multiple access points (APs) in the predetermined region into one or more virtual cells and specifying an AP in each virtual cell as a master AP; and
   generate a message indicating the dividing scheme of the virtual cells to inform the specified master APs, wherein
   the processing circuitry is configured to determine the dividing scheme of the virtual cells based on one or more of the following: backhaul capacity of the master APs of the virtual cells, and handover overhead due to handover of user equipment among virtual cells; and
   perform the determining of the dividing scheme of the virtual cells and the generating of the message in response to one or more of the following: the handover overhead of one or more current virtual cells exceeding a predetermined overhead threshold: backhaul requirement of one or more current virtual cells exceeding a backhaul capacity threshold of the respective virtual cell; and a predetermined period of time elapses.

2. The electronic apparatus according to claim 1, wherein the processing circuitry is configured to determine the dividing scheme of the virtual cells, such that a network utility value is the highest in the case of adopting the dividing scheme, wherein the network utility value is related to packet loss ratios of respective virtual cells and the handover overhead in the predetermined region,
   wherein the packet loss ratio is obtained based on the backhaul capacity of the master AP of the corresponding virtual cell and a total backhaul requirement of the virtual cell.

3. The electronic apparatus according to claim 2, wherein the processing circuitry is configured to:
   take the number of the divided virtual cells as a searching location, and perform, with respect to different searching locations, iterating operations for virtual cell dividing;

calculate, based on a virtual cell division obtained when the iteration operations complete, a network utility value corresponding to the searching location;

optimize the searching location at which to perform the iteration operations based on the network utility value, to determine an optimum searching location; and determine the dividing scheme of the virtual cells corresponding to the optimum searching location as the dividing scheme of the virtual cells to be adopted.

4. The electronic apparatus according to claim 3, wherein the processing circuitry is configured to perform the iteration operations for the virtual cell dividing as follows:

select, according to the location and backhaul capacity of each AP, a first number of APs with the first number corresponding to the searching location as candidate APs for the master AP of each virtual cell;

cluster the APs based on weighted distances between each AP and the candidate APs, wherein the weighted distance is related to an actual distance between the AP and the candidate AP, and a weighting factor based on the backhaul capacity of the candidate AP; and with respect to each cluster, update the candidate AP for the cluster, and re-perform the clustering based on the weighted distances using the updated candidate AP until a predetermined condition is satisfied, taking the candidate APs for the clusters finally obtained as the master APs of virtual cells, wherein the processing circuitry is configured to allocate an AP to a cluster whose candidate AP is corresponding to a smallest weighted distance.

5. The electronic apparatus according to claim 4, wherein the processing circuitry is configured to set the weighting factor, so that a probability for an AP being allocated to a cluster whose candidate AP has stronger backhaul capacity is larger than a probability for the AP being allocated to a cluster whose candidate AP has weaker backhaul capacity; and a probability for an AP being allocated to a cluster whose candidate AP has user equipment with a larger backhaul requirement around it is smaller than a probability for the AP being allocated to a cluster whose candidate AP has user equipment with a smaller backhaul requirement around it.

6. The electronic apparatus according to claim 5, wherein the weighting factor is a normalized value of a ratio between an estimated backhaul requirement of user equipment around the candidate AP and the backhaul capacity of the candidate AP.

7. The electronic apparatus according to claim 4, wherein the processing circuitry is configured to get boundaries of each virtual cell based on the finally obtained clustering result, and estimate, based on the boundaries and movement information of the user equipment, handover overhead among the virtual cells.

8. The electronic apparatus according to claim 2, wherein the processing circuitry is configured to:

select, according to a current load of each master AP, a predetermined number of master APs as searching nodes;

instruct the searching nodes to perform the iteration operations for the virtual cell dividing with respect to different searching locations respectively, wherein the searching location is the number of divided virtual cells;

perform following second iteration operations, until a predetermined condition is met;

acquire, from each of the searching nodes, a network utility value of the dividing scheme of the virtual cells for a corresponding searching location; and determine a global optimum searching location based on the network utility values; and provide the global optimum searching location and its corresponding network utility value to the searching nodes, so that each searching node update the searching location for next iteration operations, based on the global optimum searching location and its corresponding network utility value as well as a previous searching location and the corresponding network utility value for the searching node.

9. The electronic apparatus according to claim 8, wherein the processing circuitry is further configured to generate a distributed searching request to be provided to the selected searching nodes, and acquire a response to the distributed searching request from the searching nodes.

10. The electronic apparatus according to claim 1, wherein the processing circuitry is further configured to determine, based on the determined backhaul requirement and communication quality requirement of each virtual cell, spectrum requirement of the virtual cell, and determine a spectrum allocation scheme according to the spectrum requirements, wherein the processing circuitry is further configured to generate a message containing the spectrum allocation scheme to inform the master APs.

11. The electronic apparatus according to claim 1, wherein the electronic apparatus is located at a central management apparatus side, and the processing circuitry is further configured to interact with the electronic apparatus of another central management apparatus, to obtain information of APs in the predetermined region which are managed by the another central management apparatus and/or provide information of APs managed by the present central management apparatus to the another central management apparatus.

12. An electronic apparatus for wireless communications, comprising:

processing circuitry, configured to:

in response to a distributed searching request from a central management apparatus, perform iteration operations for virtual cell dividing in a predetermined region with respect to a particular searching location, wherein the searching location is the number of divided virtual cells;

calculate, based on a virtual cell division obtained when the iteration operations converge, a network utility value corresponding to the searching location, wherein the network utility value is a weighted sum of a function of a packet loss ratio for each virtual cell and a function of handover overhead in the predetermined region, wherein the packet loss ratio is obtained based on backhaul capacity of a master AP of a corresponding virtual cell and a total backhaul requirement of the virtual cell; and generate a message containing the searching location and the network utility value, to report to the central management apparatus.

13. The electronic apparatus according to claim 12, wherein the distributed searching request comprises one of the following: initial information for determining an initial searching location as the particular searching location: a current global optimum searching location for determining the particular searching location and its corresponding network utility value.

14. The electronic apparatus according to claim 13, wherein in the case that the distributed searching request comprises the current global optimum searching location and its corresponding network utility value, the processing circuitry is configured to determine the particular searching location based on the current global optimum searching location and its corresponding network utility value as well as a searching location and the corresponding network utility value at the time of the previous iteration operation converging.

15. The electronic apparatus according to claim 12, wherein the processing circuitry is configured to perform the iteration locations as follows:
    select, according to the location and backhaul capacity of each AP, a first number of APs with the first number corresponding to the particular searching location as candidate APs for the master AP of each virtual cell;
    cluster the APs based on weighted distances between each AP and the candidate APs, wherein the weighted distance is a product of an actual distance between the AP and the candidate AP and a weighting factor based on the backhaul capacity of the candidate AP; and
    with respect to each cluster, update the candidate AP for the cluster, and re-perform the clustering based on the weighted distances using the updated candidate AP until a predetermined condition is satisfied, taking the candidate APs for the clusters finally obtained as the master APs of virtual cells.

16. The electronic apparatus according to claim 15, wherein the processing circuitry is configured to get boundaries of each virtual cell based on the finally obtained clustering result, or
    wherein the processing circuitry is configured to estimate, based on the boundaries and movement information of the user equipment, handover overhead among virtual cells, so as to obtain the handover overhead in the predetermined region, or
    wherein the processing circuitry is further configured to provide the information of boundaries to current master APs, so that each of the current master APs estimate, based on movement information of user equipment, handover overhead due to movement of user equipment in its coverage range, and the processing circuitry acquires the information of handover overhead from the current master APs, and estimates the handover overhead in the predetermined region based on the information of the handover overhead.

17. The electronic apparatus according to claim 12, wherein the processing circuitry is further configured to acquire the finally determined dividing scheme of the virtual cells from the central management apparatus, and the dividing scheme of the virtual cells comprises one or more of: the master AP of the virtual cell, the controlled APs of the virtual cell and information of boundaries of the virtual cell.

18. The electronic apparatus according to claim 12, wherein the processing circuitry is further configured to acquire information of spectrum allocation scheme from the central management apparatus.

19. A method for wireless communications, comprising:
    determining a dividing scheme of virtual cells in a predetermined region in a dynamical manner, determining the dividing scheme of the virtual cells comprising dividing multiple access points (APs) in the predetermined region into one or more virtual cells and specifying an AP in each virtual cell as a master AP; and
    generating a message indicating the dividing scheme of the virtual cells to inform the specified master APs,
    wherein
    the method comprises determining the dividing scheme of the virtual cells based on one or more of the following: backhaul capacity of the master APs of the virtual cells, and handover overhead due to handover of user equipment among virtual cells; and performing the determining of the dividing scheme of the virtual cells and the generating of the message in response to one or more of the following: the handover overhead of one or more current virtual cells exceeding a predetermined overhead threshold; backhaul requirement of one or more current virtual cells exceeding a backhaul capacity threshold of the respective virtual cell; and a predetermined period of time elapses.

* * * * *